US012614061B2

(12) United States Patent  
Yudanov

(10) Patent No.: US 12,614,061 B2  
(45) Date of Patent: Apr. 28, 2026

(54) PIPELINING SPIKES DURING MEMORY ACCESS IN SPIKING NEURAL NETWORKS

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 737 days.

(21) Appl. No.: 17/005,040

(22) Filed: Aug. 27, 2020

(65) Prior Publication Data

US 2022/0067483 A1 Mar. 3, 2022

(51) Int. Cl.
| | |
|---|---|
| *G06N 3/049* | (2023.01) |
| *G06N 3/065* | (2023.01) |
| *G06N 3/08* | (2023.01) |

(52) U.S. Cl.  
CPC ............. *G06N 3/049* (2013.01); *G06N 3/065* (2023.01); *G06N 3/08* (2013.01)

(58) Field of Classification Search  
CPC ........ G06N 3/049; G06N 3/063; G06N 3/065; G06N 3/08  
USPC .......................................................... 706/25  
See application file for complete search history.

(56) References Cited

U.S. PATENT DOCUMENTS

| | | | | |
|---|---|---|---|---|
| 3,300,766 A | * | 1/1967 | Koerner ................. | G11C 15/02 |
| | | | | 365/171 |
| 8,988,946 B1 | * | 3/2015 | D'Abreu ............ | G11C 13/0028 |
| | | | | 365/185.23 |

| | | | | |
|---|---|---|---|---|
| 2013/0226851 A1 | | 8/2013 | Hunzinger et al. | |
| 2015/0039547 A1 | * | 2/2015 | Kang ...................... | G06N 3/063 |
| | | | | 706/42 |
| 2016/0155482 A1 | * | 6/2016 | La Fratta ................. | G11C 7/06 |
| | | | | 365/189.011 |
| 2016/0247062 A1 | * | 8/2016 | Amir ...................... | G06N 3/063 |
| 2018/0107922 A1 | | 4/2018 | Paul et al. | |
| 2018/0137408 A1 | * | 5/2018 | Mailhot ................... | G06N 3/10 |
| 2018/0139153 A1 | * | 5/2018 | Moradi ................... | H04L 49/25 |
| 2018/0174026 A1 | | 6/2018 | Davies | |
| 2018/0189631 A1 | * | 7/2018 | Sumbul ................. | G06N 3/049 |
| 2018/0189646 A1 | | 7/2018 | Kumar et al. | |

(Continued)

OTHER PUBLICATIONS

A. J. Hill et al., "A Spike-Timing Neuromorphic Architecture," 2017 IEEE International Conference on Rebooting Computing (ICRC), Washington, DC, USA, 2017, pp. 1-8, doi: 10.1109/ICRC. 2017.8123631. (Year: 2017).*

(Continued)

*Primary Examiner* — James D. Rutten  
(74) *Attorney, Agent, or Firm* — Greenberg Traurig

(57) ABSTRACT

The present disclosure is directed to pipelining operations of a spiking neural network (SNN) that performs in-memory operations. To model a computer-implemented SNN after a biological neural network, the architecture in the present disclosure involves different memory sections for storing inbound spike messages, synaptic connection data, and synaptic connection parameters (e.g., states). The section of memory containing synaptic connection data to identify matching inbound spike messages. In parallel, the section of memory containing synaptic connection parameters may be accessed to perform various neuromorphic calculations, synaptic plasticity and outbound spike message generation.

14 Claims, 8 Drawing Sheets

(56) References Cited

U.S. PATENT DOCUMENTS

| | | | |
|---|---|---|---|
| 2019/0042915 A1* | 2/2019 | Akin ....................... | G06N 3/065 |
| 2019/0286944 A1 | 9/2019 | Thorpe et al. | |
| 2020/0026995 A1* | 1/2020 | Buchanan .............. | G06N 3/049 |
| 2020/0034686 A1* | 1/2020 | Chiu ....................... | G11C 16/26 |

OTHER PUBLICATIONS

M. Davies et al., "Loihi: A Neuromorphic Manycore Processor with On-Chip Learning," in IEEE Micro, vol. 38, No. 1, pp. 82-99, Jan./Feb. 2018, doi: 10.1109/MM.2018.112130359. (Year: 2018).*

J. Wu and S. Furber, "A Multicast Routing Scheme for a Universal Spiking Neural Network Architecture," in The Computer Journal, vol. 53, No. 3, pp. 280-288, Mar. 2010, doi: 10.1093/comjnl/bxp024. (Year: 2010).*

International Search Report and Written Opinion, PCT/US2021/046724, mailed on Dec. 10, 2021.

* cited by examiner

100

100

Start

Receive inbound spike message — 701

Filter inbound spike message — 704

Assign spike message to delay buckets — 710

Identify synaptic connections associated with the source neuron — 713

Calculate synaptic current — 716

Calculate STDP — 717

Calculate and update neuronal state (e.g., membrane potential) of neuron — 719

Generate and transmit outbound spike message — 722

700

PIPELINING SPIKES DURING MEMORY ACCESS IN SPIKING NEURAL NETWORKS

BACKGROUND

A Spiking Neural Network (SNN) is a mathematical model of a biological neural network (BNN). A BNN is made up of interconnected neurons that communicate with one another using spikes. A neuron generates a spike based on other spikes, which are being inputted into it from connected neurons. Neuron to neuron connections, called synapses, differ in strength. Inbound spikes have different contributions to the generated (post-synaptic) spike depending on their synapse strength or weight.

A BNN processes information through the use of spikes traveling from neuron to neuron. A BNN learns by adding new synaptic connections, removing synaptic connections, changing strength of synaptic connections, or by changing the delay (e.g., conductive properties) in synaptic connections. For example, a person learning how to play a new instrument may change synaptic connections related to motor skills over time.

An SNN models a BNN by simulating neurons, synapses, and other elements of BNN and introducing spikes into mathematical neural networks. An SNN may be coded to execute on several processors to simulate spikes transmitted in a neural network. While a fruit fly has about 250,000 neurons and about 80 synapses per neuron, a human brain has about 86 billion neurons and 1700 synapses per neuron. Thus, scaling an SNN is challenging as the demand for computing resources to quickly process spikes increases significantly.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

The present disclosure is directed to a memory architecture for implementing a Spiking Neural Network (SNN).

According to embodiments, the memory architecture uses special purpose memory devices configured as "nodes." A node represents a group of neurons. Nodes may be coupled together over digital fiber to support a large number of neurons, thereby supporting efficient scalability. The present disclosure is directed to a pipelined architecture of memory devices that implement an SNN. Memory portions of a node are separated into different sections to handle different stages of processing spikes. This allows for contemporaneous access of different memory portions to implement pipeline stages of the SNN.

For example, a first memory section of a node processes inbound spikes. A second memory section of the node is accessed to identify the relevant synaptic connections for a particular spike. A search and match operation may be performed to identify the relevant synaptic connections. A third memory section of the node stores parameters that model each neuron and/or synaptic connection. As synaptic connections are identified, the third memory section is accessed in parallel to perform synaptic current calculations, membrane potential calculations, and other calculations relating to the properties of the neuron and/or synaptic connections. Specifically, in BNNs, spikes are not only used for processing inputs and controlling outputs, spikes also cause changes to the neural network over time so that the neural network learns. The parameters that reflect the properties of the neuron and/or synaptic connections are continuously updated in parallel with other operations. Changes to the SNN are determined by performing various neuromorphic computations using, for example, these parameters.

In addition, the processing of spikes is performed in different time steps to implement a pipeline architecture. In BNNs, information is processed based on time delays of communication in spikes across the neural network. Stated another way, information is at least in part encoded by the synaptic connections' weights and delays, which is induced by the way neurons are connected with one another. The pipeline architecture, according to embodiments, tracks and manages the strength and delay associated with each synaptic connection and supports movement of spikes relative to each time step. For example, the pipeline architecture uses delay buckets to prioritize spikes so that low delay spikes are processed before high delay spikes.

Figure 1:
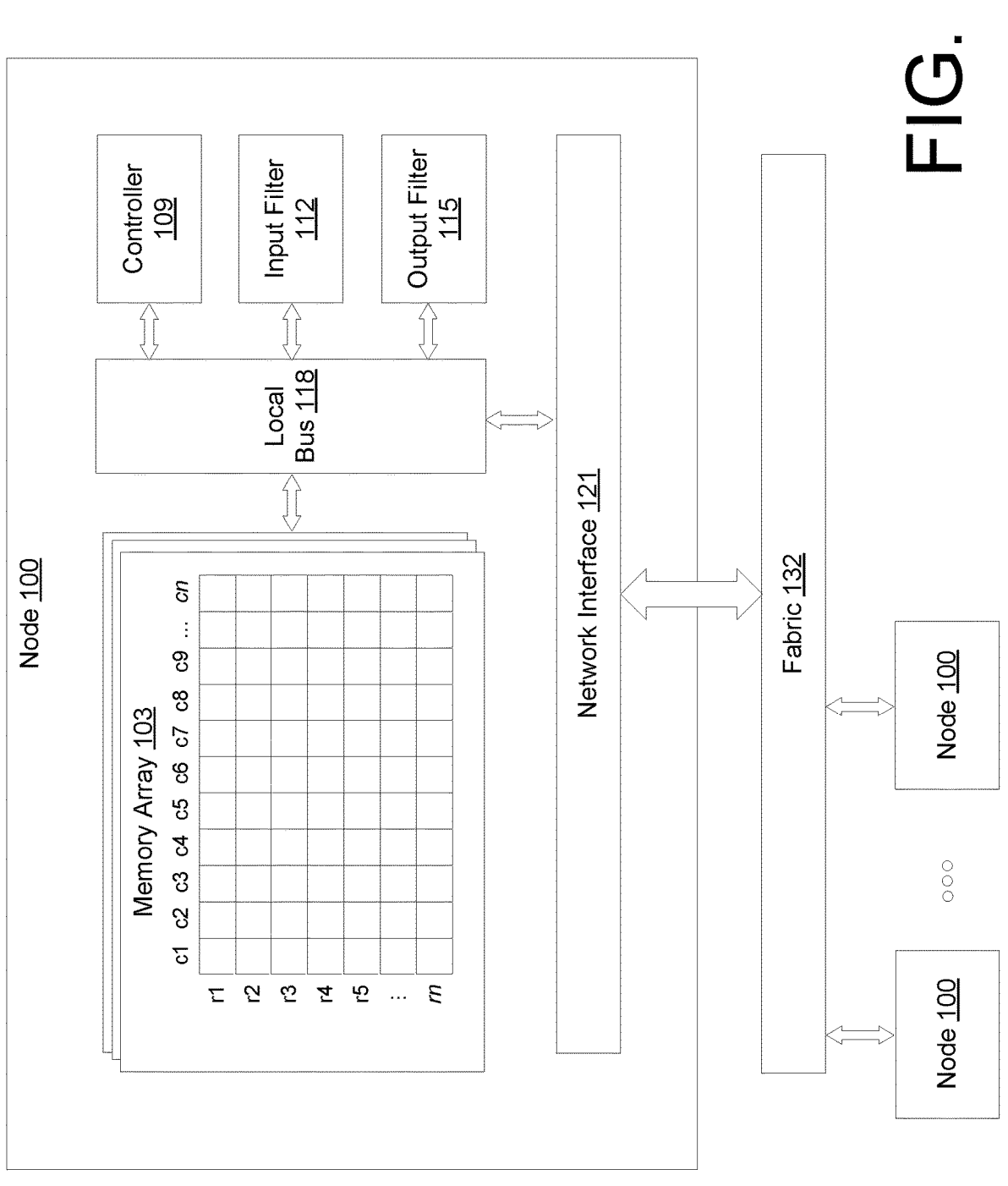
FIG. 1 is an example depicting a Spiking Neural Network (SNN) architecture of an SNN system according to various embodiments.

FIG. 1 is an example depicting a Spiking Neural Network (SNN) architecture of an SNN system according to various embodiments. The SNN architecture is made up of a plurality of nodes 100. Nodes 100 may be described as memory devices that perform in-memory processing to implement an SNN. For processing SNN in-memory, the architecture is a scalable system that provides SNN functionality using computer architecture techniques and building nodes 100. A node 100 may be a special purpose memory device that is embodied as an integrated circuit. The node 100 may be a semiconductor chip or die or a die stack.

The node 100 may include one or more memory arrays 103. A memory array 103 comprises a plurality of rows and columns and may be defined in terms of a row-column size. The example of FIG. 1 shows a memory array 103 having rows labeled r1-rn and columns c1-cn. At each row and column intersection is a memory cell configured to store a value. For example, a data array may contain four elements as follows: [A, B, C, D] where the first element is A, the second element is B, the third element is C, and the fourth element is D. The data array [A, B, C, D] may be stored in the memory array 103 such that each element of the data array is stored in a corresponding memory cell. For example, element A may be stored in cell (r1, c1), element B may be stored in cell (r1, c2), element C may be stored in cell (r1, c3), and element D may be stored in cell (r1, c4). Thus, in this example, the data array [A, B, C, D] is stored along the first row and occupies the first four columns. This is referred to as a "bit-parallel" configuration. As another example, the data array [A, B, C, D] may be stored along the first column occupying the first four rows. Here, element A may be stored in cell (r1, c1), element B may be stored in cell (r2, c1), element C may be stored in cell (r3, c1), and element D may be stored in cell (r4, c1). This is referred to as a "bit-serial" configuration. Each element [A, B, C, D] may be a binary digit (e.g., a zero or a 1, or a high value and a low value), a discrete value (e.g., a quantized value, a finite number, an integer), or an analog value (e.g., a continuous number, an irrational number). Thus, the memory array 103 is a hardware component used to store data as a plurality of array elements addressable by rows and columns.

In addition to pure bit-parallel and pure bit-serial ways of storing a data array [A, B, C, D], the data array may also be stored in a hybrid way. For example, elements A and B can be stored in a first row and elements C and D can be stored in a second row such that A and C are stored on the first column, but C and D are stored on a second column. Thus, A is aligned with B, row-wise, and C is aligned with D, row-wise. However, A is aligned with C, column-wise, and is B is aligned with D, column-wise. Besides, A and C do not need to be adjoining row-wise, and B and D do not need to be adjoining row-wise. Also, A and C do not need to be adjoining column-wise, and B and D do not need to be adjoining column-wise. Thus, in various embodiments, combinations of bit-serial and bit-parallel arrangements are contemplated.

According to embodiments, the node 100 may be a Resistive Random Access Memory (ReRAM), 3D Cross Point (3DXP), or other memory devices that implement resistive memory cells or rather memory cells that can offer to flex or modulate their conductance. Such cells can be diodes, transistors including floating gain and replacement gate transistors, etc. For example, resistive memory cells store data by modulating the resistance of the memory cell according to the data it stores. If a resistive memory cell stores a binary zero ("0"), the resistance may be set to a low value so that the memory cell forms a short circuit (e.g., a resistive short). The memory cell stores a binary one ("1"), the resistance may be set to a high value so that the memory cell forms an open circuit (e.g., a resistive open). The resistance may also be set to be intermediate resistances to store discrete values (e.g., quantized values). The resistance may also be set to be within a range of resistances to store analog values. Memory cells may also include asymmetric elements such as diodes where current passes in one direction but is otherwise impeded in the opposite direction. Other asymmetric elements that may serve as memory cells include, for example, transistors and magnetic tunnel junctions (MTJs).

The node 100 may include a controller 109, an input filter 112, an output filter 115, a local bus 118, a network interface 121, and potentially other integrated components. The controller 109 may be a special-purpose processor or other component that implements logic that is executed by the node 100. The controller 109 may comprise integrated circuitry dedicated to store data in the memory array 103 by organizing the data according to different patterns. The controller 109 may include fast memory elements such as registers, Static Random Access Memory (SRAM) arrays, caches to store temporal data for quick access.

In some embodiments, the controller 109 may be implemented as a separate device that couples to the node 100. For example, the controller 109 may be implemented in an Application-Specific Integrated Circuit (ASIC), Field Programmable Gate Array (FPGA), or other special purpose processor. The controller may thus be part of a host device that couples to the node 100.

In addition, the controller 109 may receive input data, store the input data, access the input data, read out the data stored in the memory array, perform pattern matching operations to determine if the input data matches a pattern stored in the memory device node, and perform other memory operations (e.g., in-memory operations) to implement part of an SNN. The controller 109 may include microcode that controls which word lines and bit lines are activated and in what sequence. Word lines and bit lines are activated by applying a voltage or supplying a current to selected word lines and bit lines. They may be referred to as an activation signal. In some embodiments, the controller 109 may adjust the strength of the activation signal by varying the voltage or current depending on the application.

Communication with a node is made using messages called spike messages. A spike message is modeled after the electrical/chemical signal in a biological neural network (BNN). For example, in a BNN, a neuron generates a spike based on other spikes, which are being input into it from connected neurons. Neuron to neuron connections, called synapses, differ in strength, polarity (excitatory vs inhibitory) and many other neuroscientific aspects (e.g. N-Methyl-d-aspartic acid or N-Methyl-d-aspartate (NMDA) type, ion channel and receptor composition, neurotransmitter orientation and so on). Thus, inbound spikes have different contributions to the generated (post-synaptic) spike depending on their synapse strength (called weight). When modeling the BNN in a computer implemented SNN, each synapse weight may be dynamically adjusted according to various learning rules. Typically, these rules may consider spike timing as the basis, e.g. if the time of inbound spike was before or after the time of generated spike.

In a BNN, a spike arriving into a synapse of one neuron (post-synaptic neuron) from another neuron (pre-synaptic neuron) triggers the release of a neurotransmitter in a small gap between the axon and the synapse (called synaptic cleft). The neurotransmitter binds to receptors (or ion channels) of post-synaptic neuron. These receptors open-up a 'hole' in the body of the neuron in explosive-like chain-reaction manner (one receptor triggers opening another), thus resulting in the current influx. A small amount of neurotransmitters is enough to trigger this chain reaction. Thus, arriving spike is normally approximated as 'binary' all-or-none event, and the synaptic strength is proportional to the number of these receptors. A node 100 in the SNN architecture of FIG. 1 handles inbound spike messages and generates outbound spike messages, where each spike message models the electrical and chemical signaling between neurons in a BNN.

Each node 100 is modeled to represent a cluster of neurons. Terms such as, for example, "neuron," "spike," "synapse" refers to the biological components in a BNN as well as the computer implemented components that are modeled after their respective biological components. A single node 100 may receive spike messages directed to one or more neurons within a cluster represented by the single node 100. The SNN architecture may use neuron identifiers to address specific neurons included in the node 100. In addition, the SNN architecture may store synaptic connection IDs to represent a synaptic connection between two neurons. Because a neuron may be synaptically connected to several other neurons, there will be more unique synaptic connection identifiers than neuron identifiers.

A node 100 may generate outbound spike messages by the neurons contained within the node 100. The node 100 may include an input filter 112 for processing inbound spike messages and an output filter 115 for processing outbound spike messages.

By including an input filter 112 for a given node 100, the node 100 can filter in the inbound spike messages directed to target neurons inside the node 100. The output filter 115 can filter out generated spike messages that have target neurons in other nodes 100. Spike messages generated within the node 100 for neurons within the node 100 may remain inside the node 100. The transmission of spike messages among a plurality of nodes 100 may appear like a selective broadcast operation or multicast operation that targets a range of neurons across one or more nodes 100. Neurons may be addressed (e.g., targeted) by a spike message using a synaptic connection identifier that associates a source neuron ID to a target neuron ID.

The filter function of the input filter 112 and/or output filter 115 may involve a match operation performed on a subset of synaptic connections addressable by a synaptic connection identifiers (ID) that links a source neuron to a target neuron. Such synaptic connection identifier can be or otherwise include a source neuron ID. The source neuron ID may be part of a spike message descriptor. An address scheme with predetermined algorithmic allocation may be used to accelerate the filter operation performed by the input filter 112 or output filter 115. For example, neurons may be allocated such that the node identifier of the node 100 matches a subset of bits in the source neuron IDs. In a hybrid identification method, a combination of an input filter 112 (or output filter 115) and an address scheme can be used as well. In some embodiments, the input filter 112 (or output filter 115) include a lookup table comprising the neuron IDs of a particular node 100. The input 112 and output 115 filters may be configured to perform matching operations to match the source neuron ID of an inbound spike message to the target synapse of a target neuron within the node 100, where the target neurons are linked to the source neuron via a synaptic connection. An example of pattern matching using resistive-like or diode-like memory arrays is described in patent application Ser. No. 16/902,685 titled "Matching Patterns in Memory Arrays," which is incorporated by reference in its entirety. Synaptic IDs may be stored as patterns in a memory array 103. For example, the synaptic connection ID may be stored along a particular bit line (or word line) of the memory array 103. The source neuron ID of a spike message may be matched against the memory array 103 to determine if the synaptic connection ID is present in the memory array 103. The bit line (or word line) may correspond to a key-value pair that links to a portion of the memory array 103 that contains additional information pertaining to the synaptic connection including the connection strength, weight, precise delay value, last time the connection was a subject to a spike and other data. To this end, a bit line in the memory array at least in part may correspond to a synaptic connection that is matched to a source neuron ID. The bit line may map to another memory section that stores synaptic connection parameters for the matching synaptic connection.

The components of a node 100 may be coupled via a local bus 118. The local bus 118 may provide access to the memory 103 for routing commands related to processing spike messages. The node 100 may also include a network interface 121. The network interface 121 may provide data and/or control signals between the node 100 and other nodes 100 or external systems. Thus, network interface 121 may couple the node 100 to fabric 132.

The fabric 132 may deliver generated spike messages so they may be consumed by all targeted nodes 100. When modeling the SNN after a BNN, the delivery time depends on the delay, which is unique for each axon, but within a range of 1 millisecond to 100 milliseconds. A real neuron may have a delay that depends on the length of its axonal tree trunk common to all axonal branches, and specific from that common point to the synapse. In some embodiments of the SNN architecture, a spike message may include descriptors such as, for example, a neuron ID, time, a delay, and potentially a spike strength.

The fabric 132 may need to achieve a minimum bandwidth to support all connected nodes 100. The bandwidth requirements to allow for node interconnectivity may be reduced using an intelligent allocation of neurons and synapse placement. Synapses may be placed by neighboring with their connections to each other entirely within a node 100. This may reduce outbound spike message traffic. Normally, biological neurons have more local connections than remote ones. Thus, neural net connectomes naturally support this allocation. The allocation also could have a reduction gradient in connectivity with neighboring nodes 100 as they become more distant. As a result, another technique is a selective broadcast or multicast where most of the spike traffic is localized within neighboring nodes 100 with descent in connectivity gradient for more remote nodes 100. Additional filters (e.g., input filters 112 or output filters 115) can be placed along the fabric 132 to support selective broadcast, such that the filters can permit spike messages with certain neuron IDs into respective sections of the fabric 132. This can reduce redundant traffic.

The remaining FIGs. illustrate embodiments of handling inbound spike messages though a pipeline architecture within the SNN system described in FIG. 1. For example, the input filter 112 of a node 100 receives spike messages. The node stores various synaptic connections (referenced by synaptic connection IDs). A synaptic connection stores a connection between two neurons (each of which are referenced by respective neuron IDs). In addition, the node 100 may store parameters (e.g., weights) about each synaptic connection. These parameters may dictate how spike messages are communicated from neuron to neuron. The pipeline architecture supports the ability to perform a mathematical operation using relevant synaptic connection parameters in parallel with performing search operations to match a spike message to a target neuron.

Figure 2:
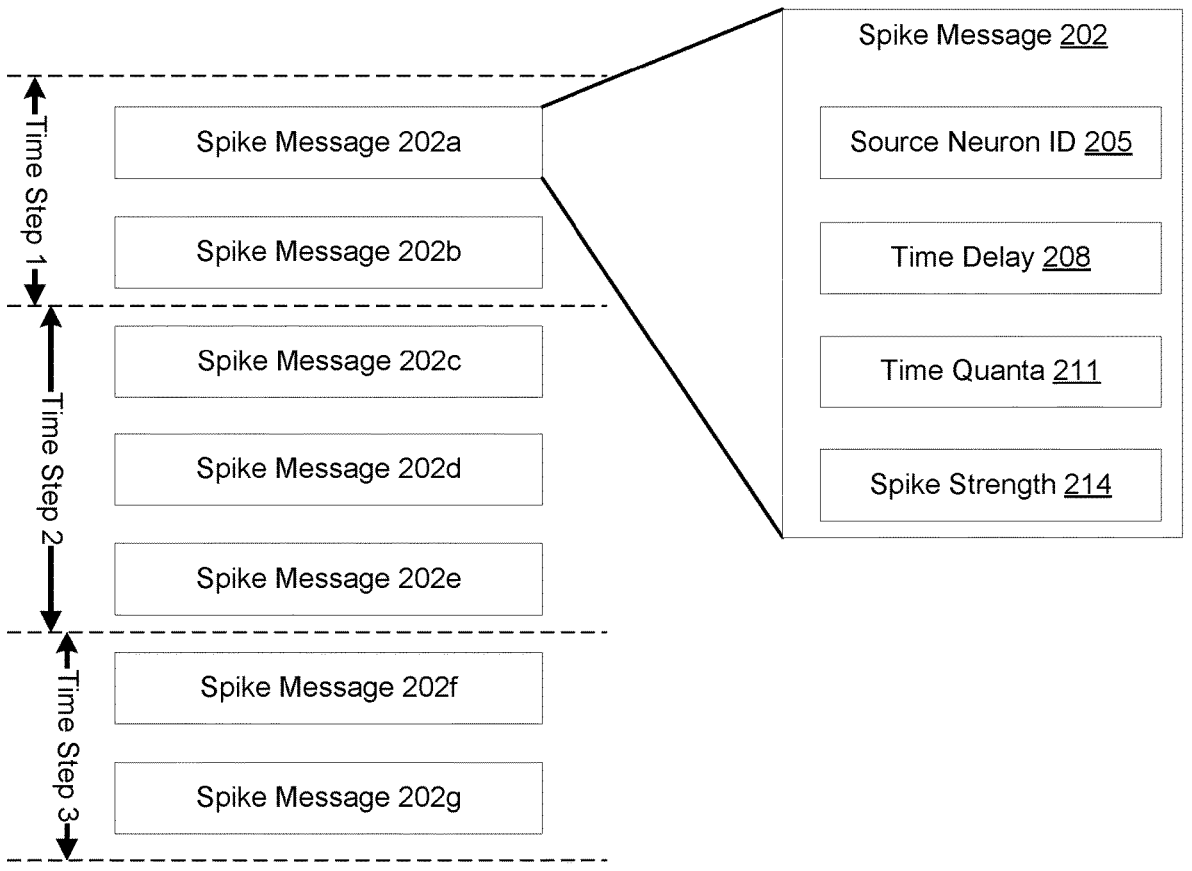
FIG. 2 is drawing of spike messages communicated within the SNN system according to various embodiments.

FIG. 2 is drawing of spike messages communicated within the SNN system according to various embodiments. The SNN architecture may time slice the flow of spike messages into sequential steps. That is, the communication of a spike message occurs in a given time slice (e.g., a time interval or time step). This quantizes the transmission of spike messages into various sequential time steps. In FIG. 2, three sequential time steps are shown. Each time step may span 1 millisecond. In this embodiment, a first time step spans the first millisecond, the second time step spans the second millisecond, the third time step spans the third millisecond, etc.

In the first time step, the input filter 112 of a node 100 may receive a finite number of spike messages including a first spike message 202a and second spike message 202b. In the second time step, the input filter 112 may receive additional spike messages including a third spike message 202c, a fourth spike message 202*d*, and a fifth spike message 202*e*. In the third time step, the input filter 112 may continue to receive additional spike messages including a sixth spike message 202*f*, and a seventh spike message 202*g*. Each spike message 202 (e.g., 202*a-g*) may conform to a predefined spike message format. The predefined spike message format may include a set of spike descriptors. The spike descriptors may include a source neuron ID 205, a time delay 208, a time quanta 211, a spike strength 214 and potentially other information.

In some embodiments, the source neuron identifier 205 may be 37 bits. The bit length of the source neuron identifier 205 may depend on the number of neurons in the SNN system. For example, 37 bits may be sufficient to address all neurons in an SNN that is the size of a human brain (e.g., 86 billion neurons). The time quanta 211 may identify the quantized time step that the spike message was generated. For example, the first spike message 202*a* and second spike message 202*b* may have the same value for the time quanta 211. The third, fourth, and fifth spike messages 202*c-e* may have the same value for the time quanta 211, a value that is incremented by one from the previous time step. In some embodiments, the time quanta may be 7 bits to cover the range of 1 millisecond to 100 milliseconds. The range may be bounded by the longest time it takes to transmit a spike in a BNN. In some cases, time quanta can be omitted in a message if all messages are delivered within minimum delay time from time when they are generated. The time delay may reflect the delay properties of the spike message. In a BNN, the time delay is a function of the physical properties of at least the source neuron, and axon. The 7 bits may be sufficient to cover a range of 1 millisecond to 100 milliseconds for time-delay information. In some embodiments, the value of the time delay 208 may be stored with the synaptic connection.

Figure 3:
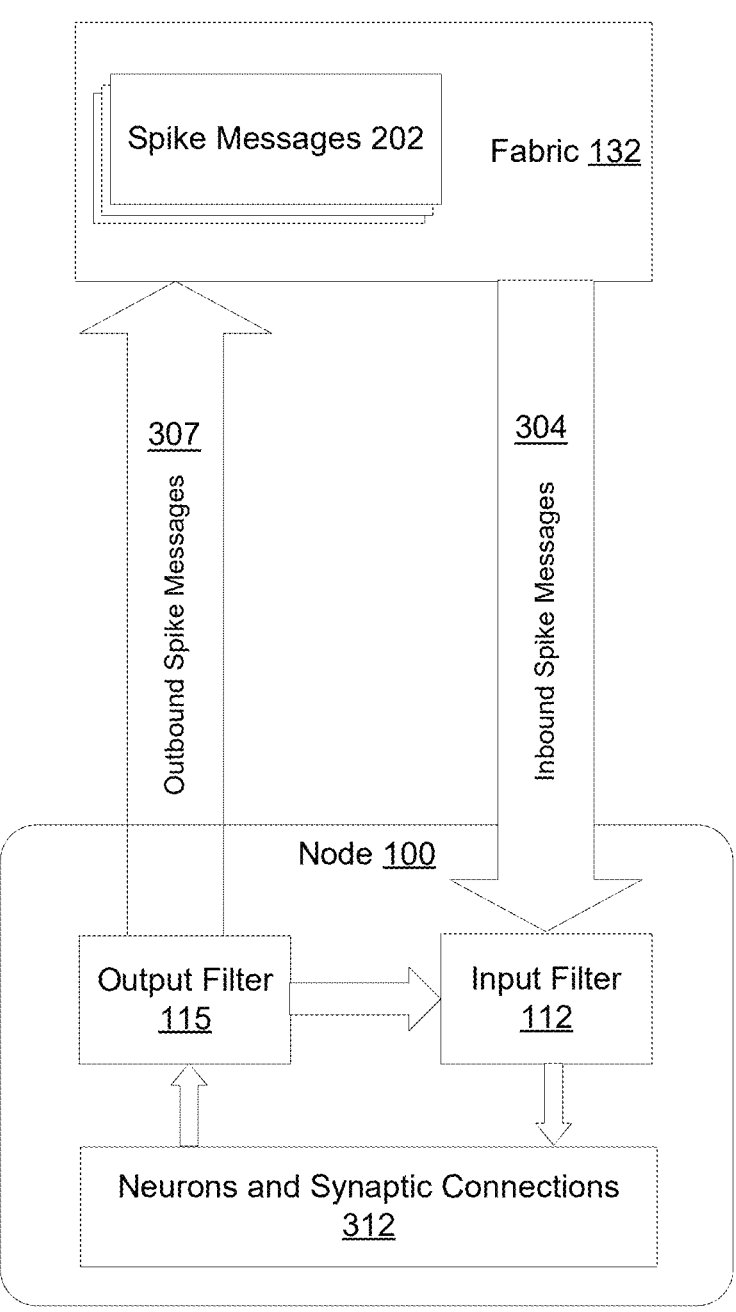
FIG. 3 is drawing of a node coupled to fabric within the SNN system according to various embodiments.

FIG. 3 is drawing of a node coupled to fabric within the SNN system according to various embodiments. FIG. 3 provides a high-level overview showing the flow of spike messages to and from a node 100. As mentioned above, the node 100 represents a cluster of neurons that are referenced by neuron IDs. In addition, each synapse of a neuron in the node 100 is connected to a source neuron, where the connection is referenced by a synaptic connection ID. Spike messages 202 may, at some point, travel from the fabric 118 to a particular node 100. The spike messages 202 are referred to as inbound spike messages 304. The node 100 includes an input filter 112 that is configured to determine which of the inbound spike messages 304 are directed to the neurons of the node 100. For example, it may be the case that none of the inbound spike messages 304 are targeting neurons in the node 100.

The input filter 112 is configured to perform a match operation to select a subset (e.g., all, some, or none) of the inbound spike messages 304 based on whether they target a neuron in the node 100. The input filter 112 may, therefore, reduce the workload performed by the node 100 by identifying a subset of inbound spike messages 304 relevant to the node 100. Match operations can be at least partly based on matching a source neuron ID from a spike message with a range of synaptic IDs stored in a node 100. Such ranges can be represented by bit patterns or sequences.

After filtering the inbound spike messages 304, the node performs two primary operations. One primary operation is generating outbound spike messages 307 based on the neurons and synaptic connections 312 of the node 100. The other primary operation is changing the properties of the neurons and synaptic connections 312. The neurons and synaptic connections 312 are digital, mixed signal, or analog representations of the neurons and synaptic connections in a BNN. The neurons and synaptic connections 312 may have various parameters and weights that model and define the intrinsic properties of the neurons and synaptic connections 312. In this respect, the parameters of the neuron or synaptic connections 312 represent the state of the neuron or synaptic connection. One parameter that may define the neuron's state may include the neuron's cell membrane potential. One parameter that may define the synaptic connection's state is a synaptic strength (weight) value that models the resistance or conductance of the synaptic connection. Another parameter that may define the synaptic connection's state 312 is a delay value. There are many more other parameters possible to include in the similar manner. The implementation may depend on the synaptic and neuronal models chosen for the SNN.

BNN's process information and provide "intelligence" by the way neurons fire and synapses change their properties. A biological input (e.g., a sensory signal) initiates the triggering of spikes through the BNN. Different groups of neurons are activated in a particular sequence and in a particular timing to eventually activate some biological output (e.g., a hand muscle). A BNN learns by rewiring or restructuring neural connections by adding new neural connections, removing old neural connections, increasing resistance between neural connections, introducing delay, or decreasing resistance, reducing delay. This is referred to as synaptic plasticity, in which the changing of the way neurons are connected in response to repeated spiking or lack a spiking. Thus, the BNN continues to relay spikes to process inputs and generate outputs while contemporaneously rewiring itself to learn. Similarly, the SNN architecture maintains information that defines neurons and synaptic connections 312. This information is used to generate outbound spike messages 307 while also being dynamically updated to effectively "learn."

To elaborate further, the main principle of SNN learning rules is that "neurons that fire together wire together" which is referred to as Hebbian learning. One such rule depends on spike timing, which is the time of an incoming into neuron spike relative to a generated by the neuron spike. This is mathematically modeled as Spike-Time-Dependent Plasticity (STDP). STDP is a feature of biological neurons to adjust their synapses according to pre- and post-spike timing. For the pre-synaptic spikes arrived before their post-synaptic (i.e. target) neuron made a spike, their synapses are potentiated. For the pre-synaptic spikes arrived after their post-synaptic neuron made a spike, their synapses are depressed. The magnitude of synapse conductance change (potentiation or depression, i.e. up or down) is determined by exponential-like curves. One curve is Long-Time Potentiation (LTP), which determines the magnitude of synapse conductance change for synapses receiving spikes before the target neuron generates a spike. Another curve is Long-Time Depression (LTD), which determines the magnitude of synapse conductance change for synapses receiving spikes after the target neuron generates a spike. STDP rules allow an SNN to continuously "error-correct" each synapse locally.

In a computer memory-implemented system of an SNN, handling STDP may involve storing pre-synaptic spikes for the time length of LTP window, and then, once a post-synaptic neuron generates a spike, "replay" these events and adjust synaptic conductance values accordingly. Another way is to implement the "eligibility window" feature at memory cell level or memory architecture level. SNN structural plasticity can be implemented by adding low-efficacy synaptic connections as determined by plasticity rules and letting them evolve by applying STDP calculations or by eliminating synaptic connections that decayed their value to very high resistance (low efficacy).

As the neurons and synaptic connections 312 change over time via STDP rules, neurons and their synaptic connections 312 generate outbound spike messages 307. An output filter 115 may determine how to route the outbound spike messages 307. For example, the output filter 115 may broadcast or multicast the outbound spike messages to other nodes 100 over the fabric 132. The output filter 115 may also determine that some of the outbound spike messages 307 are targeting neurons within the same node 100.

Figure 4:
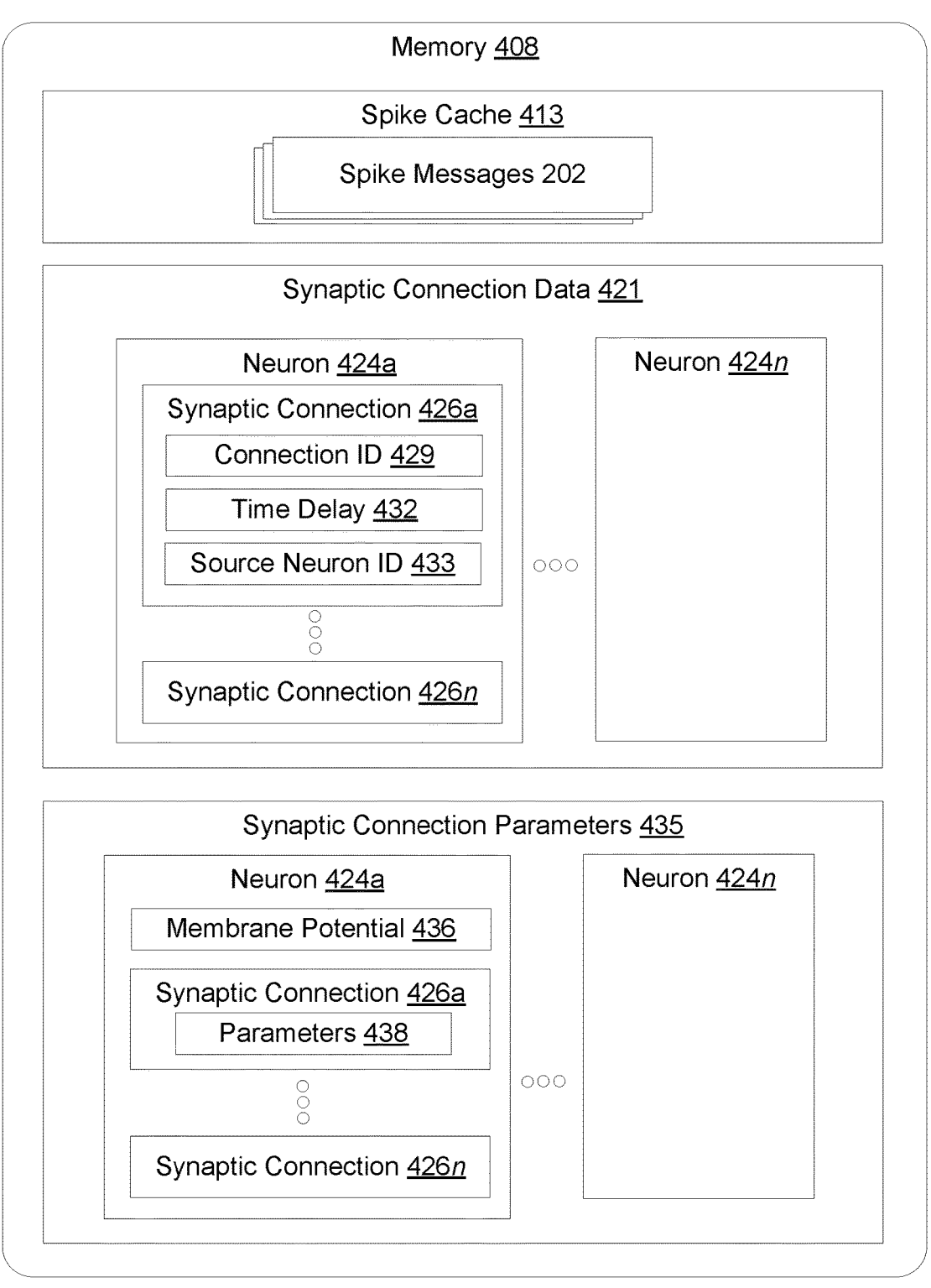
FIG. 4 is a drawing of a memory of a node within the SNN system according to various embodiments.

FIG. 4 is a drawing of a memory of a node within the SNN system according to various embodiments. FIG. 4 provides an example of a memory structure for storing information related to neurons and synaptic connections 312, storing, queuing, and prioritizing inbound spike messages 304/outbound spike messages 307, and managing the storage of other data related to SNN operations. The memory structure shown in FIG. 4 provides an example of organizing information to allow for the pipeline processing of spike messages 202 handled by a node 100.

FIG. 4 depicts a memory 408 of a node 100. The memory 408 may include one or more memory arrays 103 or other collections of memory cells. The memory 408 may be divided into multiple sections such as, for example, a spike cache (e.g., a first memory section), a section for storing synaptic connection data 421 (e.g., a second memory section), and a section for storing synaptic connection and neuronal parameters 435 (e.g., a third memory section). Each memory section may be defined by one or more memory array identifiers that identify specific memory arrays 103, a row (or word line) range(s), a column (or bit line) range(s), one or more deck identifiers that identify decks (e.g., layers in 3D memory devices), or other groupings of memory cells.

The first memory section may be reserved for a spike cache 413. The spike cache is configured to store spike messages 202 in a predefined number of spike groups. For example, the spike cache 413 may store all inbound spike messages 304 that are filtered in by the input filter 112. In other words, the spike messages 202 are filtered such that they involve neurons within the node 100. Spike messages 202 that are not targeting neurons in the node 100 are not stored in the spike cache 413.

In some embodiments, each spike message 202 is assigned to a corresponding spike group according to a value of time delay 208 contained in the spike message 202 or in a simple case, to a group with most recently arrived spikes. A spike group may be a "bucket" having a corresponding label or identifier. The use of spike groups allows for the prioritization of spike messages having less delay over spikes having a greater delay, as well as for continuous motion of spikes in time.

To explain further, for a particular time step, a set of spikes passes through the input filter 112 and is stored in a spike group within the spike cache 413. The spike group may have an identifier (e.g., label "0") indicating that it is the group of the most recent spikes. The labels for subsequent groups are incremented by 1. There may be as many spike groups as there are time steps in the maximum possible delay. For example, given the maximum delay of 100 milliseconds and time step 1 millisecond, there are 100 spike groups and associated labels. These spike groups make up the spike cache 413 with temporal locality and a schedule associated with processing spikes according to this locality.

In some embodiments, spike messages do not need to remain stored for entire duration until they become associated with the largest delay bucket (e.g., 100 milliseconds). Rather, they can be removed (invalidated) from the cache as soon as their longest delay is processed. Thus, this helps to keep the cache utilization efficient.

In some embodiments, the spike cache 413 includes a small table that can store a "label<=>pointer" to its spike group stored in memory's association. The label that is incremented to label 100 eventually circles back to label "0." Old spikes can be discarded or overwritten by newly arriving spikes. This incrementation functionality can be achieved by incrementing a single rotating counter (e.g., an increment operation and modulo operation). The counter points to the label with the most recent spike group to which newly filtered spikes can be placed in the current time step. Alternative to placing all spikes in the current time step, they can be placed to relevant buckets according to delay information in the spike messages. Spike groups may be described as opaque memory allocations that store spike message descriptors, however physically they may be not opaque but distributed.

The second section of memory may be reserved for synaptic connection data 421. For example, the second section of memory is configured to store data indicating a plurality of synaptic connections, where each synaptic connection references a set of neuron identifiers. The second section of memory may be organized by neurons 424a-n. For example, FIG. 4 shows storing data for a first neuron 424a through a last neuron 424n. For each neuron 424, the second section of memory stores a set of synaptic connections 426a-n. Each synaptic connection 426 may include data comprising, a synaptic connection ID 429, a time delay 432, and/or a source neuron ID 433 (e.g., the pre-synaptic neuron ID). In some embodiments, this synaptic connection ID is the same as source neuron ID or otherwise includes the source neuron ID, thus eliminating necessity to store both. A synaptic connection in a BNN involves the axon of a source neuron connecting to the dendrites of one or more target neurons. Thus, the synaptic connections 426 for a given neuron 424 are accessible and identifiable using synaptic connection ID 429. Further, each synaptic connection 426 specifies the source neuron ID 433 of the transmitting neuron. In some embodiments, the synaptic connection ID is the same as source neuron ID, and hence not needed. The time delay 432 or other parameters may define the characteristics of the synaptic connection. In some embodiments, the time delay 432 stored in the node 100 has a precise value while the spike message 202 includes a time delay 208 having a coarse value. In some embodiments, the aforementioned variables can be stored in different sections of a memory array or in different memory arrays at corresponding relevant positions.

To explain further, each neuron 424 has pre-synaptic (incoming or source) connections 426a-n. These connections may be grouped or ordered by delay value. In a BNN, the spike is communicated across the synaptic connection 426. The spike experiences a delay, where the delay is how the BNN, at least in part, encodes information. In other words, the timing of firing neurons is how information is processed in a BNN. In the SNN architecture, the delay is modeled using one or more delay values. The spike message 202 may include a time delay 208 that is a coarse value. The synaptic connection 426 may store a time delay 432 having a precise value. Taking together, the sum of the coarse value and precise value of the time delays 208, 432 represent the overall delay for a particular synaptic connection 426.

The coarse time delay 208 may have some range: e.g. between 1 millisecond and 100 milliseconds. The coarse time delay 208 is quantized in increments of time steps. If high delay precision is required, then this coarse delay value can be made more precise by adding the precise time delay 432 (e.g. a floating-point value between 0 and 1 signifying precise delay within a time step). The precise time delay 432 provides an addition to quantized delay and may be used in some embodiments to improve accuracy. Depending on embodiment a precise time delay to be added to a coarse time delay may involve a floating point or integer or some other custom format.

Synaptic connections 426 of each neuron 424 may also be organized and processed in buckets in the increments of a time-step (e.g. 1 millisecond) according to the coarse delay value.

The memory 408 of the node 100 may also include a third memory section reserved for storing neuronal and synaptic connection parameters 435 for each synaptic connection associated with a particular neuron. For example, the third memory section may organize the data by neurons 424*a-n*. Data that models each neuron 424*a-n* is stored in this section of memory. This may include a membrane potential 436 and other parameters 438 of each neuron. These parameters may include all synaptic connections associated with a neuron such as the synaptic connection 426. The membrane potential in a BNN is an intrinsic property of the neuron that defines the neuron's state. The membrane potential changes over time based on current dynamics across membrane at least in part due to received spikes. In other words, the strength of spikes received by the neuron and the frequency that spikes are received change the neuron's membrane potential over time. In an SNN, the membrane potential 436 is recorded as a value stored in memory for each neuron 424. The membrane potential 436 may be continuously updated in response to a particular neuron receiving a spike message 202. Besides membrane potential other neuronal variables that define neuronal state may be stored. Those variables may include various ionic currents, permeability states, concentration of certain chemicals and so on.

Other parameters 438 include weight values of each synaptic connection 426 associated with a particular neuron 424. When stored in memory, synaptic connections may be grouped by neuron with which the synaptic connections are associated. A synaptic connection may be modeled having a particular weight. Weight combinations of multiple synaptic connections lead to the training and learning of an SNN. The weights change over time as a result of STDP. STDP turns a neuron to serve as a selector device. A neuron evolves to exhibit a particular weight combination across its synaptic connections. Quantifying the connectivity using weights allows the SNN to generate outbound spike messages.

The Synaptic Connection Parameters 435 are used to perform a current integration operation for calculating how a neuron's 424 properties change over time (e.g., the neuron's membrane potential 436) and for determining the outbound spike message 307 generated by each neuron 424 that spikes.

The organization of the node's memory 408 shown in FIG. 4 allows for inbound spike messages to be queued in a spike cache 413. Synaptic connections may be searched for based on the source neuron ID 205 contained in each spike message 202. Such search may be performed within each delay bucket or group, by which the spikes are stored in the cache. This may involve performing in-memory pattern searching techniques for matching the source neuron ID 205 in the spike message 202 to source neuron ID 205 in the synaptic connection data 421 of a second memory section. As part of the pipeline architecture, in response to matches being found in the second memory section, the targeted neurons 424 and/or synaptic connections 426 that have yielded matches may then be identified and may point to the neurons 424 and/or synaptic connections 426 of a third memory section. Current integration, neuronal integration, STDP operations and other neuromorphic features may be performed using synaptic connection parameters 435 stored in the third memory section.

In some embodiments, spike messages are not stored in delay buckets. For example, at each time step, a node admits filtered spike messages. These spike messages are matched against synaptic IDs of all neurons in the node. Synaptic IDs can be pre-sorted, and this speeds up matching process. A spike ID may immediately indicate the location (e.g., index) of all target synapses and relevant neurons. Each synapse may include a counter that is instantiated with a delay value (or zero). The clock for each counter is decremented (or incremented) until it ends reaching zero or some other predetermine delay value.

The ending of a counter means that spike message arrived at its synapse. This search and match process may be pipelined into synaptic and neuronal computations, which result in new spikes sent to the network.

One way to implement this is using a self-counting cache made up of spike IDs and one or more associated self-decrementing counters, each counter having a signal line. The signal lines may be dual signal lines. For example, the signal line may have a horizontal and vertical signal lines, where the intersection of which within a grid of counters signify which counter is due. Such signal lines may be pull-up or pull-down lines.

Figure 5:
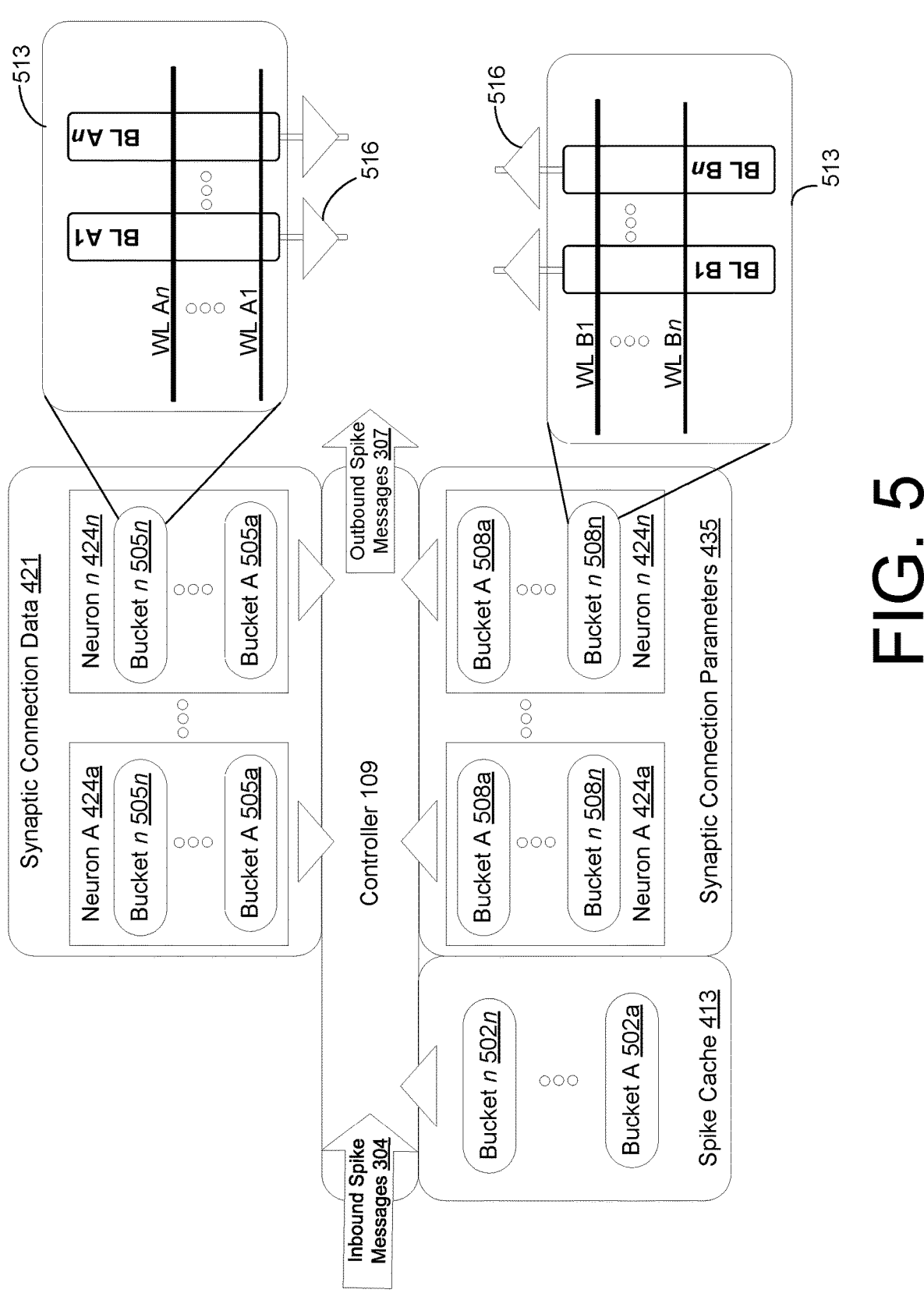
FIG. 5 is a drawing illustrating the functionality and structure of a node within the SNN system according to various embodiments.

FIG. 5 is a drawing illustrating the functionality and structure of a node within the SNN system according to various embodiments. FIG. 5 builds upon the memory structure of FIG. 4 and illustrates the pipeline architecture of performing searches and calculations of synaptic connections in parallel. FIG. 5 shows the spike cache 413 organized by a predefined number of buckets 502*a-502n*. Each bucket, be it logical or physical, corresponds to a different time step in which inbound spike messages 304 are received. A controller 109 may receive the inbound spike messages 304. An input filter 112 may filter in only the relevant spike messages that target neurons 424 within the node 100. Along with filtering, other operations may be performed by the input filter. Such operations include, for example, the determination of synapses and neurons which are targeted by the spikes, the placement of spikes into hardware queues or directly into spike cache, the handing of spikes to the controller, etc. The controller 109 may store the inbound spike message 304 in a corresponding bucket 502 based on the value of the time delay 208 in the inbound spike message 304, or in a simple case in a bucket 1 (minimum delay bucket). Thus, inbound spike message 304 are grouped together by sequentially ordered buckets 502 based on a quantized time delay. The spike messages of a bucket 502 are processed together before moving onto the spike messages of the next bucket 502.

Similarly, synaptic connection data 421 are organized by a predetermined number of buckets 505*a-n* and the synaptic connection parameters 435 may also be organized by a predetermined number of buckets 508*a-n*. Each bucket 505, 508 may include a set of memory cells 513 within the memory array (e.g., defined by a row/column range), where the memory cells 513 are coupled to a sense amplifier 516.

There may be the same number of buckets 502, 505, 508, for the spike cache 413, the synaptic connection data 421, and the synaptic connection parameters 435. For example, there may be 100 buckets ranging from bucket 1 to bucket 100. There may also be a circular bucket counter that increments at each time step from 1 to 100 and then circles back to 1. For example, at clock cycle i, the controller 109 processes the buckets 502*i*, 505*i*, 508*i*–1, in relevant memory section. Specifically, buckets 502*i* and 505*i* are involved in search and match operation (matching spike IDs in a bucket i from spike cache with synaptic IDs in Synaptic Connection Data 421). The outcome of this operation is the determination of which synaptic connections are matched with which spike messages. This data is used in the next clock cycle with bucket 508*i*. Also, in the clock cycle i the controller 109 processes the bucket 508*i*–1 for synaptic connections determined as matched in the previous cycle when performing search and match on buckets 502*i*–1 and 505*i*–1. Processing bucket 508*i*–1 may involve current integration, neuronal integration, STDP operations and other neuromorphic features. In the next clock cycle, the bucket counter is incremented to bucket i+1 and the controller 109 processes the second buckets 502*i*+1, 505*i*+1, 508*i*, in each memory section. The processing is the same as in clock cycle i. This process repeats for all delay buckets. For example, if there are 100 delay buckets, then there are 100 clock cycles for a single time step (e.g., clock cycle i). As a result of this pipelined process, a search and match operation occurs in parallel with neuromorphic operations. Each time step involves processing all delay buckets, but the main difference between consecutive time steps is that delay buckets rotate by 1 position and they are searched/matched against different synaptic connection buckets. The usage of term 'clock cycle' may be replaced with a 'step' or the like. The clock cycle or step for this processing by delay bucket may be local and separate from the time step applied to synchronize global operations of the complete SNN system.

Many synaptic events (e.g., newly generated spike messages) are generated at each time step upon detection of a match of a spike ID with synaptic ID for synapses of each neuron 424 from various time step buckets. In this respect, all neurons and all buckets per neuron can be processed concurrently in a pipeline architecture. This involves first performing a search/match operation to locate synaptic connections 426. For each successful match, the next immediate step is to integrate post-synaptic current related to that match. In a BNN, post-synaptic currents are generated due to local openings in cell membrane, and they may be integrated for all successful matches per neuron. The integration process can consider the distance of synapse to neuron soma (requires more complex integration scheme) or it can omit this complexity, which essentially reduces it to simple current summation, the currents generated according to synaptic efficacies triggered by spikes. In the SNN architecture, current integration operations are performed by accessing the memory section containing the synaptic connection parameters 435 while the search/match operation is performed on the memory section containing the synaptic connection data 421. Many optimizations are possible for allocation by buckets. This may include, for example, sorting neurons by commonality of connections and storing them in memory thereby allocating neurons to nodes. Another optimization is injecting spike messages in the delay bucket according to their minimum delay and discarding spike messages from delay buckets according to their maximum delay. Thus, unnecessary match operations are reduced. This would require adding a minimum delay info to the spike message descriptor. Another optimization is sorting spike messages in each spike bucket according to spike neuron IDs, and sorting synapses in each synaptic bucket. This may limit the processing range to only subset of spike IDs.

Spike IDs is one common dependency that can be exploited for match operations. For example, a spike ID can be mapped to a set of word lines (WLs) that drive a memory array section and each bit line (BL) may respond with a match/mismatch signal. Another dimension to parallelize is delay buckets. For example, each delay bucket can be stored in a different memory array and can perform match operations in parallel with other buckets. Neuronal parallelism is another dimension. In this example neurons can be distributed among many subarrays. Alternatively, matching can be done in more serial way, e.g. down to 1 bucket at a time in a single array, as long as all buckets are done long time before the real time step (e.g., 1 ms) expires so to assure Quality of Service (QoS). Many pipelined and multiplexed variants of this methodology are possible.

In some cases, the match is implied by the network topology, and can be avoided. For SNN sections with regular connections, such as performing convolutional operations, the network topology fits well within a memory array. The search and match operation may be the same for many neurons. Cortical columns have similar but less structured topology. For other SNN sections, synaptic connections may differ largely from neuron to neuron.

In some embodiments, both match and current summation in place in memory array, such that match operation, is fused with current integration (e.g. a match operation gates current integration locally to each memory cell (or a group of cells)). This may involve forming conditional memory such that it provides access to the content of a second cell group upon detecting a pattern match on the content of the first group. The access is provided in place (without going via sense amps). As a result, multiple patterns could be streamed into multiple groups of WLs of a device like this and BLs would generate the computation results in place. The potential of such memory would be broad, and may include cryptography, content-addressable memory, in-memory logic, graph operations, or other networks beyond SNN. One potential way to achieve this may be a double-decker configuration, where first deck would store keys and second deck would store values accessible conditionally upon matching the keys. Another way is a NAND string gating a WL of NOR row containing synapses of all neurons that have synaptic ID stored in a NAND memory device. Yet another way is a NAND string gating another section of a NAND string containing synaptic information.

Performance of such memory may depend mostly on the number of incoming spike messages per delay bucket. For example, with an average of 100 spike messages per delay bucket in a node 100, the system may need 100 clocks per time step.

Figure 6:
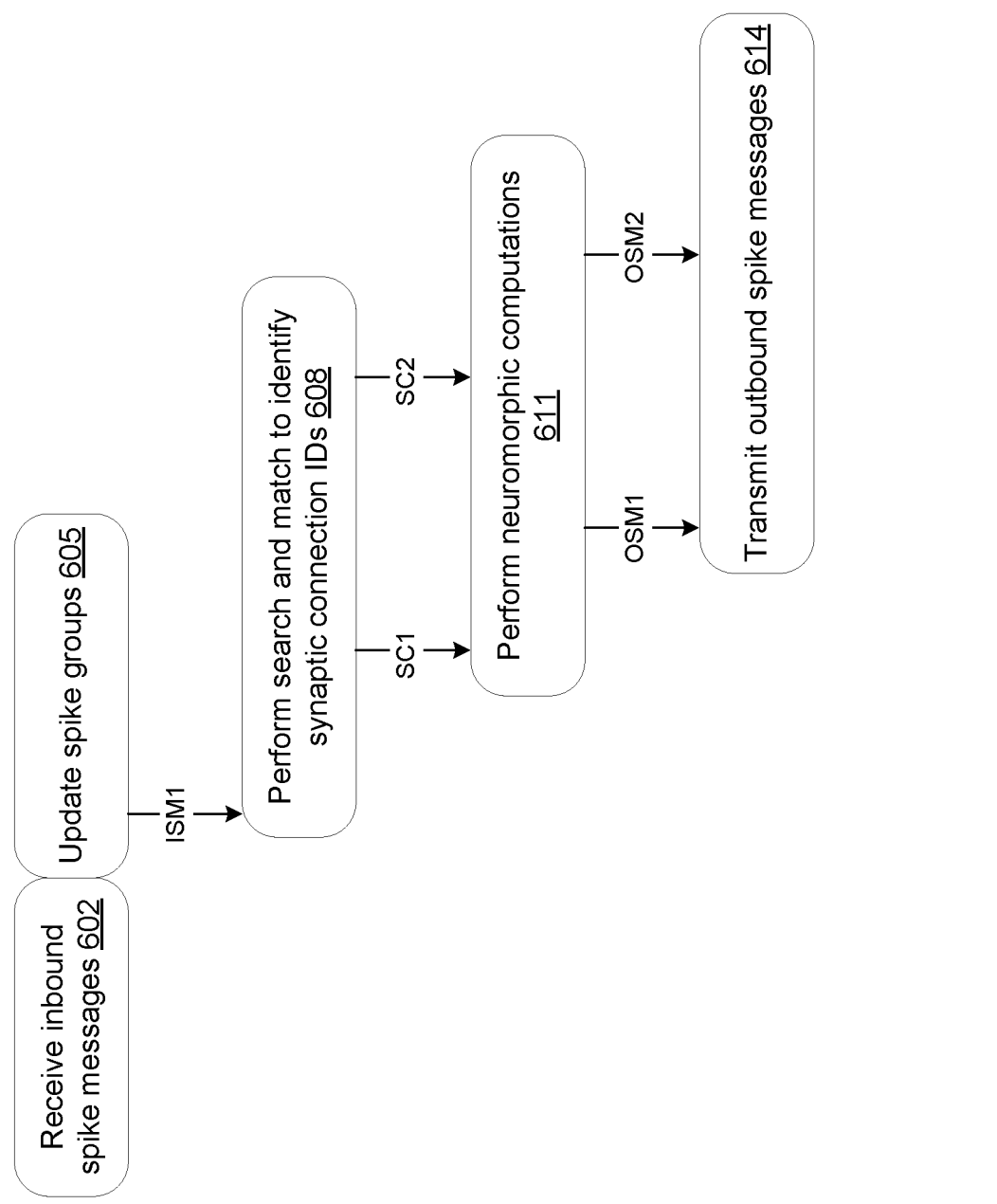
FIG. 6 is a drawing illustrating parallel processing by a node within the SNN system according to various embodiments.

FIG. 6 is a drawing illustrating parallel processing by a node within the SNN system according to various embodiments. FIG. 6 shows operations of a node 100 arranged in a pipeline architecture to provide parallel processing of finding targeted synaptic connections 426 and performing the current integration calculations using the parameters of the targeted neuron. FIG. 6 shows the pipeline of operations moving from left to right within a particular time step (e.g., for the current bucket).

At item 602, the node 100 receives inbound spike messages 304. A filter 112 may filter out spike messages that are not directed to the node 100. Spike messages 602 are received via fabric from other interconnected nodes 100.

At item 605, the node 100 updates spike groups. For example, the controller 109 may store the inbound spike messages 602 in corresponding buckets 502 based on the time delay 208 in the inbound spike messages 602 or in a current bucket 1 in a simple case. Inbound spike messages 602 indicating a smaller delay are cached in a bucket towards the current bucket as indicated by a circular bucket counter. A circular pointer incrementation may occur prior to caching the spike messages.

Next, each spike message stored in all buckets is processed using search and match operation. For example, FIG. 1 shows the processing of a first inbound spike message (labeled as "ISM1"). The ISM1 is a spike message contained in the current bucket based on the circular bucket counter corresponding to the current time step. There may be several other spike messages within the current bucket as well as other buckets, however, FIG. 6 shows processing a single inbound spike message 304. The ISM1 is generated from a source neuron (e.g., pre-synaptic neuron) having a source neuron ID 205. The source neuron may have synaptic connections with one or more target neurons 424 in the current bucket. The ISM1 should be targeted to each neuron 424 that is synaptically connected to the source neuron.

At item 608, the node 100 performs a search and match to identify synaptic connection IDs 429. The search and match operation may be an in-memory operation to determine whether the memory is storing a source neuron identifier 433 that matches the source neuron identifier 205 of the ISM1. And if so, where in memory it is located. For example, the search and match operation may involve an in-memory pattern matching operation to determine whether the memory array 103 contains an input pattern (e.g., a bit sequence corresponding to the source neuron identifier 205). Thus, the search and match operation may involve comparing a bit pattern of a source neuron identifier contained in the spike message to several bit patterns stored in the memory to identify a synaptic connection. This can happen either in bit-serial, bit-parallel, or hybrid way discussed above.

Upon locating a match, the synaptic connection ID 429 is determined. In some embodiments, a key-value pair is used to associate the source neuron identifier 433 to the synaptic connection ID 429. For example, if a matching neuron identifier 433 is located on a specific bit line(s) and word line(s), then bit line(s) and word line(s)mapped to a particular memory location containing the synaptic connection ID 429 for the synaptic connection. FIG. 6 shows the identification of a first synaptic connection 426, (labeled as "SC1"). In other words, the search and match operation performed on ISM1 yielded SC1. Neuromorphic computations for a single neuron may require yielding all synaptic connections SC1 for that neuron (i.e. identifying all synapses that receive spikes in the current time step). As noted above, the ISM1 may target multiple synaptic connections of multiple neurons.

In some embodiments, an array of source neuron identifiers 433*a-n* are stored in serial rows. For every row of serially stored source neuron identifiers 433*a-n* a sense amp array produces a bitmask signifying which source neuron identifiers 433*a-n* have a match to any of source neuron identifier 205 of the ISM1 in the current bucket. During the search and match operation, every bit of all inbound spike messages in the all buckets is matched and tested against a respective bit retrieved from the memory (relevant delay bucket that stores synaptic IDs), thereby producing intermediate bitmasks. Each bit of this bitmask is updated as subsequent bits for each of the source neuron identifiers 205 are being compared. In the end, after sequencing through the rows and comparing each bit from these rows with each relevant bit of each of the source neuron identifier 205, a bit in the bitmask may indicate a match. These bitmasks (1 bitmask per sense amplifier) may be stored in a fast storage (e.g., Static RAM (SRAM) or fast Dynamic RAM (DRAM) array) proximate to each sense amplifier. The bitmasks can be used for optimization such that a single bit mismatch eliminates a potential match for subsequent bits of a source neuron identifiers 205 in the inbound spike message 304. In addition, multiple comparators and additional local fast storage may be added per sense amplifier to hold wider bitmasks. In some cases, with 3D memory topology groups of bits of the same synaptic ID can be distributed among multiple decks or die in a memory stack, hence allowing parallel comparison operation at each deck or die.

In some embodiments, the source neuron identifiers 433*a-n* are stored in non-volatile memory to support in-memory search and match operations. The search and match operation may be performed by activating a group of word lines that store the source neuron identifiers 433*a-n* in parallel and also activating a group of bit lines that store the source neuron identifiers 433*a-n* in parallel. Thus, the search and match operation can be fully overlapped with memory accesses using pipelining and multiplexing. Some memory access techniques with computation on bit line when applied to non-volatile memory allow to "pack" this step into fewer operations by performing parallel match on concurrently activated word lines and sensing bit lines.

Upon identifying SC1, the node 100 may perform neuromorphic computations. For example, at item 611, the node 100 performs neuromorphic computations. This may include performing synaptic current integration and membrane potential calculations, as well as synaptic plasticity computations including STDP and structural plasticity computations. These operations mathematically model synaptic plasticity. In some embodiments, the neuromorphic computation is fully overlapped with memory accesses using pipelining and multiplexing. Some memory access techniques with computation on bit line when applied to non-volatile memory allow to perform synapse change in-place in memory arrays 103. Overall neuromorphic computations 611 may be a relatively large computational operation that uses significant computing resources. As shown in FIG. 1, the neuromorphic computations (e.g., current integration, membrane potential calculation, etc.) is performed immediately upon identifying SC1. In addition, synaptic plasticity can be interleaved with current integration. Specifically, LTP based on synaptic events in previous time steps can be computed in the current time step upon detection a neuron fire in the previous time step. Detection of a neuron fire or spike is done after solving for the neuron model membrane equation, which is a differential equation based on the change in membrane potential over time and based on the calculated current resulting from performing a current integration. The current integration is based on a weight change based on past and future spikes relative to a post-synaptic spike. The weight of the neuron may be stored as a synaptic connection parameter with respect to a particular neuron 424.

The synaptic plasticity computations (e.g., STDP and structural plasticity computations) result in updated values of synaptic connection parameter 435. Specifically, this may involve calculating a new weight values of a synaptic connection. The synaptic plasticity computations involve STPD (LTD and LTP) equations utilizing pre- and post-synaptic spike timings and current state of each synapse.

Power efficiency may be optimized when accessing synaptic connection parameter 435 (e.g., weights). For example, a bitmask may be generated indicating the location of matching identifiers. However, such bitmasks may be sparse in the sense that only a few matches occur (e.g., 1% of all target identifiers). Each bitmask represents a unique neuron. Memory that uniquely accesses each cell in a column or a row may be used to access the synaptic connection parameter 435. Weights from each column or each row may be accessed at unique positions in a column or row. However, this is difficult in memory devices with shared WLs. Hence, all BLs are accessed per WL. The node may shunt or mask accessing some BLs to save power with some memory technologies while also utilizes sparse memory accesses with other computation.

As a result of various neuromorphic computations, the node 100 may generate an outbound spike message (labeled as "OSM1") OSM1 is generated at least in part by locating SC1 in a memory section and performing in memory calculations in a different memory section to generate OSM1 based on SC1 (OSM1 may or may not be generated in the current time step depending on the neuron state). While SC1 is identified and OSM1 is generated, the search and match operation may continue to occur in the memory section that stores synaptic connection data 421. For example, ISM1 may target multiple synaptic connections, each of which are searched for in the memory section that stores synaptic connection data 421. The pipeline architecture allows the identification of an additional synaptic connection (labeled as "SC2") while neuromorphic computations take place with respect to SC1. SC2 may involve a second targeted neuron 424 that is also spiked by ISM1. SC2 be used to generate a second outbound spike message (labeled as "OSM2"). Thus, the operations shown in item 608 occur in parallel (at least partially) with respect to the operations shown in item 611. The node's 100 memory architecture supports this parallel pipeline processing by storing synaptic connection data 421 in one memory section (for performing search and match operations) and storing synaptic connection parameters in different memory section to perform synaptic plasticity computations on matching neurons/synaptic connections and to generate outbound spike messages.

At item 614, the node 100 transmits outbound spike messages. For example, an output filter 115 may process output spike message and transmit them to other nodes 100 via fabric 132 and/or transmit them internally within the same node 100.

The following provides additional example of handling spike messages that are generated in respond to inbound spike messages. Upon detection of a generated spike message, the neuron ID that generated the spike message is reported to node 100 (e.g., a filter or router associated with the node). The node 100 prepares spike descriptors for all spiked neurons that generate outbound spike messages. The node 100 performs a broadcast or multicast operation so that the spike descriptors are transmitted throughout the SNN system. The output filter may also filter out the spikes that have local connections within the node and distribute them to the relevant delay buckets locally. Thus, the broadcast or multicast operation can start within a fraction of a clock cycle (in real time) for all memory arrays in the SNN network. Because the membrane potential may be computed in an SIMD manner for the entire memory array, the detection and production of post-synaptic spike messages are also performed in parallel for all neurons. Upon sending all spike messages to the SNN network, the node 100 can send a barrier message containing the number of spikes it generated so that recipient router could execute the barrier along with other barriers from other instances of this component. Such barrier message as well as all spike messages may also contain relevant identifiers of the neuron and/or node.

Some embodiments are directed to using a node 100 having a memory structure made up of multiple decks. Multiple decks may be leveraged to provide the parallelizing of the search and match operation with the neuromorphic computations (e.g., current integrations). In some embodiments, pre-synaptic ID bits may be spread among several memory arrays by means of multiplexing. This may greatly improve performance. For example, spreading IDs to 37 arrays (to track to the size of a human brain made up of 86 billion neurons) may result in 37-fold reduction in latency for the search and match operation. This may be referred to as a multiplexed configuration that achieves High-Performance Computing (HPC). Accumulation of synaptic current and weight with vertical integration may require a floating-point adder distributed among different decks or bonded die. This may eliminate the requirement of wide Input/Output. In general, a whole single instruction multiple data (SIMD) processor made up of floating point Fuse Multiply Accumulate (FMA) units could be distributed among decks, hence implementing compute-on-a-way paradigm.

Figure 7:
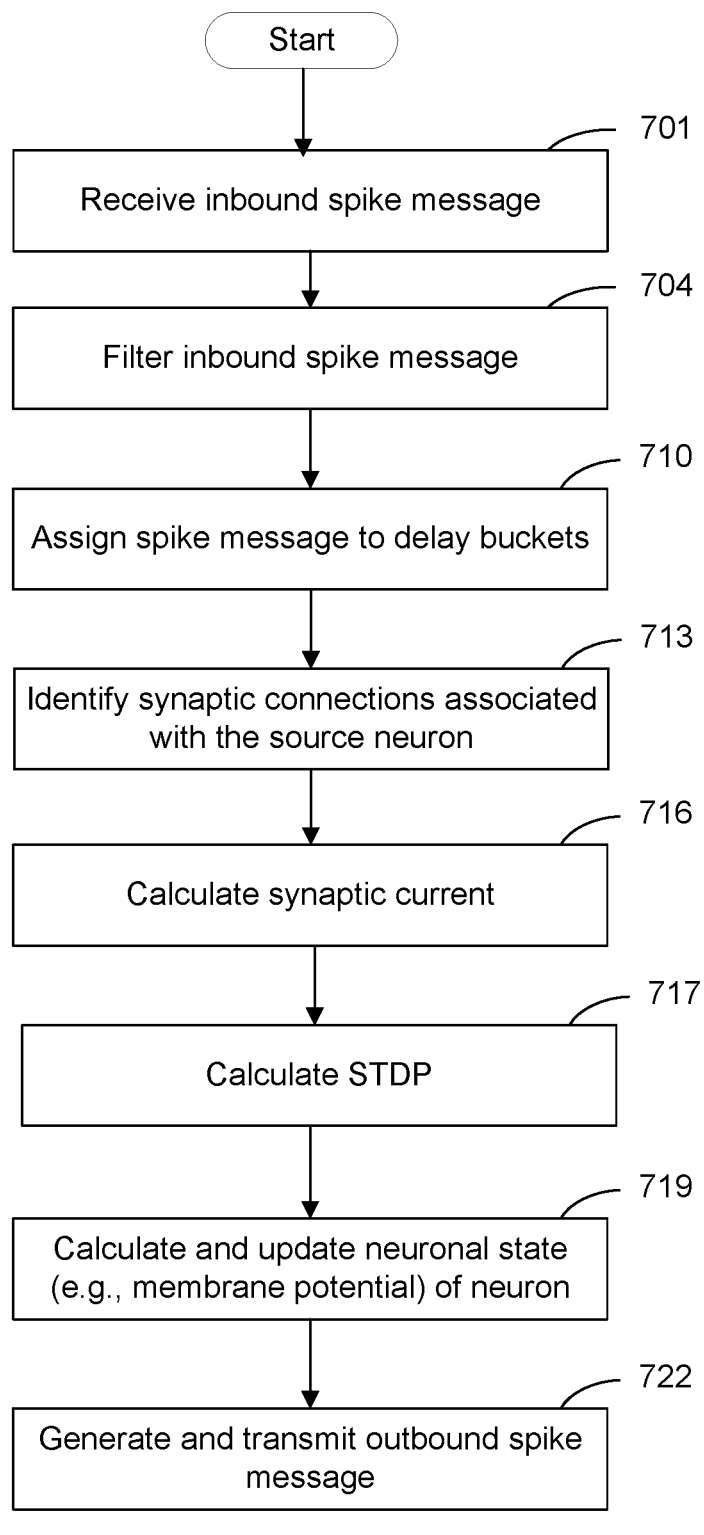
FIG. 7 is a flowchart illustrating varying examples of operations performed by a node within the SNN system according to various embodiments.

FIG. 7 is a flowchart illustrating varying examples of the functionality of a node 100 according to various embodiments. The boxes in the flowchart may represent microcode, machine code, firmware, or other software executable by the controller 109 or other logic in the node 100. The boxes of the flowchart may alternatively represent steps in a method 700. The method may be performed by the node 100. The items in a method 700 at least in part can be pipelined and overlapped in time with each other within the same or different time step of SNN operation.

In addition, the operations shown in FIG. 7 may represent in-memory processes that operate on memory cells by activating rows/columns and performing accumulation operations, multiplication operations, comparison operations, or other operations using a sense amplifier array within or near the memory array 103.

At item 701, the node 100 receives one or more inbound spike messages 202. Inbound spike messages 304 may be received as internally generated spike messages within the node 100. Inbound spike messages 304 may be received from other interconnected nodes 100. In some embodiments, the inbound spike messages 304 are received on a per-time step basis. For example, the node 100 may be configured to operate in a time step that processes inbound spike messages 304 in the corresponding time step that they are received.

At item 704, the node 100 filters the inbound spike message 304. An input filter 112 may be used to allow only those inbound spike message 304 that are targeting neurons within the node 100. The filter operation may be used as a processing optimization to reduce the workload of the node so that it processes only the relevant inbound spike messages. This applies in cases where spike messages are broadcasted to multiple nodes 100 even if the node 100 might not have a target neuron.

At item 710, the node assigns the inbound spike messages 304 corresponding buckets 502 (delay buckets). Each inbound spike messages 304 may contain a time delay 208 that quantifies the delay properties of the spike message. The time delay 208 may be a quantized value (e.g., an integer between 1 and 100). The node may track a series of buckets and selecting the next bucket in the sequence as the current bucket. Inbound spike messages 304 having a short time delay 208 are placed in the delay bucket closest to the current bucket while inbound spike messages 304 having a long time delay 208 are placed in the delay bucket farthest to the current bucket. Inbound spike messages 304 having no time delay 208 are placed in the current delay bucket. After the current bucket is processed, the bucket counter increments to the next bucket to process the spike messages stored in that bucket. Ultimately, spike messages 202 are stored in a first memory section of the node 100, which may be referred to as a spike cache 413. This may involve organizing the spike messages by spike group (e.g., a bucket) according to a time delay value contained in the spike message 202.

At item 713, the node 100 identifies one or more synaptic connections 426 for each spike message 202. A spike message 202 may include a source neuron ID 205 which refers to the pre-synaptic neuron that generated the spike message 202. Thus, the source neuron ID 205 may also be referred to as a pre-synaptic ID. To identify connections 426, the node 100 may store data indicating a plurality of synaptic connections as synaptic connection data 421 in a second memory section. The node 100 may perform a search and match operation to match the source neuron ID 205 in the spike message 202 to synaptic connection data 421. In some cases, a search and match operation is bucketized. For example, spike messages with relevant "aged" delay are matched to the synaptic connections with the same delay (e.g., spike IDs in each bucket in the first memory is matched to synaptic IDs in relevant bucket in the second memory). This may involve performing an in-memory pattern recognition operation, such as bit-serial, bit-parallel or hybrid types or others. Synaptic connection data 421 may include a synaptic connection ID 429 for each synaptic connection 426. The synaptic connection 426 links the identifier of a source neuron 433 to the identifier of a target neuron 424. The synaptic connection ID 429 may include at least part of the source neuron ID 433 and/or the identifier of the target neuron 424. Thus, each synaptic connection 426 references a target neuron identifier by either linking to or implying (e.g. by position of allocation within memory array) the target neuron identifier or otherwise containing the target neuron identifier. In this respect, each neuron 424 is a target neuron having a neuron identifier.

At item 716, the node 100 calculates a synaptic current for the spike message 202 that is targeting the neuron 424. The node 100 may perform a current integration operation using equations that model the synaptic current. For example, once the synaptic connection is identified, the parameters of the source neuron and target neuron 424 are known by accessing a third memory section that contains synaptic connection parameters 435. The synaptic current may be calculated in parallel while additional synaptic connections are searched for with respect to any and all spike messages 202 of the current bucket.

At item 717, the node 100 calculates at least the LTP part of STDP for neurons that spiked in the last time step. This operation may occur before or after current integration for each synaptic connection so to have updated synaptic weight. In addition, it involves retrieving time of the last synaptic event and computing weight change. This allows the node 100 to retrieve synaptic weight(s) for each connection only once from memory and perform both LTP and current integration operation in a single operation for each synaptic connection of each neuron. In addition to LTP, LTD may also be computed for all synaptic connections that received spike messages in the current time step. LTD operation may occur after or during current integration and may involve the retrieving last spike time for the neuron having the synaptic connection that received a spike message in the current time step and computing LTD weight change.

At item 719, the node 100 calculates and updates the neuronal state of the neuron associated with the targeted synaptic connection. The neuron state may include, for example, the neuron's membrane potential (e.g., which may be referred to as Vm). Membrane potentials may be calculated using differential equations and using the calculated synaptic current and the current local potentials. This most recent membrane potential 436 is then updated after calculating a new membrane potential 436. Calculating the membrane potential 436 involves accessing the third memory section that contains synaptic connection parameters 435 and neuronal state variables and parameters. The membrane potential 436 is calculated after all synaptic connections are searched for with respect to any and all spike messages 202 of the current bucket and after current integration is performed for any particular neuron. However, amongst different neuron this operation may still be parallel. Updating the membrane potential 436 allows for the SNN to generate new spikes in response to receiving (or not receiving) spike messages over time.

In some embodiments, instead of solving for the membrane potential digitally, a neuron model can be implemented using analog values or an analog state. For example, a population of leaky DRAM capacitors (partial DRAM column) can be used to model the membrane potential. Synaptic current can be injected into that array of capacitors, then the membrane potential can be measured with a precise sense amp and tested for a spike. An array of SIMD processors can be designed to implement both or either of the analog implementation or the digital implementation.

Items 716, 717, and 719 refer to various neuromorphic computations. This may involve determining, updating, and using weights that characterize a synaptic connection. The weights may be allocated in a similar pattern as the pre-synaptic IDs, which makes their access suitable for operations performed by a controller 109 predicated by the bitmasks. Thus, upon generating a bitmask for a delay bucket, the controller 109 can start accessing relevant weights corresponding to all set bits in the bitmask and accumulating synaptic currents into designated registers for each neuron (e.g., 10 bit lines per neuron). If the controller 109 has multiplexed a set of memory arrays of the same BW as bit addressing (e.g. 32 arrays for 86 billion neurons that track to a human brain) then it may start accessing all of them in the background concurrently with performing the match operation. For example, the weights could be co-allocated with pre-synaptic IDs in a bit-serial configuration but may require wider memory array. Alternatively, the controller 109 could start accessing only relevant weights when bitmasks are available to consume less power.

Various embodiments may be directed to a weight allocation strategy. That is, how are weights stored and accessed in the node. Weights may be allocated in a bit-serial manner (e.g., similar to allocation of pre-synaptic IDs), a bit-parallel manner, a rectangular manner, or other configurations. Assuming that there may be an average of 10 synaptic matches per neuron (e.g., for human brain: 1% of 1000 connections) this results in analyzing the sum of only $10 \times 1.6K = 16K$ weights per processor (e.g., single instruction multiple data (SIMD)). This may be very sparse and may reduce a requirement on the SIMD to have 16K Fuse Multiply Accumulate (FMA) units (e.g., 1.6K, one per neuron or less, may be sufficient keeping it ported to 16K-wide memory array). Thus, a bit-parallel allocation may have better power benefits and reduce requirements on memory bandwidth, especially if memory array capabilities allow to shunt or mask off some sections of array per memory row. Also, this configuration may lead to faster processing during the LTP operation. Shunt or predicated bit-serial allocation can also reduce power. The bit-parallel way of storing, however, may require a fixed mapping scheme from bit-serially allocated array of IDs to bit-parallel allocated array of weights. In either case, computations involving synaptic integration can be completely hidden and performed during the background of the search and match operation if another array (or a set of arrays for highly multiplexed version of this method) is available and operable concurrently with the array of pre-synaptic IDs. Some embodiments involve the co-allocation of weights with pre-synaptic IDs bit-to-bit. This embodiment, may require a wider array (at least twice as wide as other configurations).

The following provides additional examples of calculation the LTD and LTP portions of the STDP, which may be part of the neuromorphic computations. After solving for Vm and testing for a spike (in this case, the post-synaptic spike and the spike of the neuron behind its synapses are detected), is to apply a learning rule (STDP). For the LTD part of STDP the synaptic efficacies may need to be depressed for all pre-synaptic spikes arriving after post-synaptic spike within an LTD window. The decrease of weight is performed as per the LTD curve, and may depend on a time when a pre-synaptic spike arrived relative to the time of post-synaptic spike. Thus, post-synaptic spike time step is recorded right after or during the solving for Vm and testing for a spike (this spike time can be part of neuron-related variables). This recordation is within the Vm computation time budget. Subsequent post-synaptic spikes of the same neuron may over-write its last spike time, and the entire LTD window "restarts" from a new time for the particular neuron. The LTD task of weight reduction can be merged with the above task of synaptic integration. Synaptic integration may involve each weight receiving a spike to be retrieved from memory upon detection of the match of spiked neuron ID with pre-synaptic ID stored in memory. Thus, before synaptic integration, a weight of each neuron needs to be reduced as per LTD rule.

For an "online" implementation of LTD, it may be sufficient to have one most resent pre-synaptic spike, because the update is immediate (in the current time step). Thus, the magnitude of the weight change is based on the last post-synaptic spike time and current weight value.

With sufficient compute capabilities of an array of SIMD processors, this computation can be budgeted within (on the background of) the search and match operation. Some embodiments involve using a Custom STDP instruction that retrieves post-synaptic spike time for all neurons only once. Then it may compute all values dependent on that time and reuse these intermediate computed values for each weight to compute the updated weight value and also perform synaptic integration. Every subsequent bitmask of matches may trigger synaptic integration and/or the LTD rule and produce its results in parallel. The reduction of weights may still be valid if the neuron makes a spike in the current time step. This may be the case because the Vm computation, and consequently post-synaptic spike generation, depends on the synaptic integration performed with already updated weights per LTD dependent on the last post-synaptic spike.

Performing the LTP part of STDP may be more complex because it depends on pre-synaptic spikes arrived within the LTP window before post-synaptic spike. Hence, LTP can be computed at the time of post-synaptic spike or speculatively pre-computed before it. The size of LTP window is usually about 100 milliseconds for an SNN that models the human brain. The LTP computation may be triggered by a post-synaptic spike as detected during the Vm computation. Hence, it can be processed in parallel with the spike communication phase and independent of it but within remaining time budget of the time step (e.g., 1 millisecond). Alternatively, the LTP can be computed speculatively during the search and match operation and the synaptic integration operation. Yet, in another embodiment, the LTP can be computed in the next time step before synaptic integration (merged with it), thus, resulting in accessing synaptic weight only once per time step. Yet, in another embodiment, the next time step can proceed in the current time step merged with the LTP and can precompute the entire system state before receiving next spikes, thus ready to be only updated upon receiving new spikes in the next time step. The latter case may be referred to as "step-ahead" or recursive is most attractive among all since it is asynchronous and partly event-driven.

In some embodiments, LTP computation are performed after detecting a post-synaptic spike based on keeping time of last pre-synaptic spike for each synapse for the duration of LTP window. For example, each neuron may need to be stored with a corresponding pre-synaptic spike history. A compact way to keep this history is before expanding spikes via the search and match operation as simple continuation of the spike cache for additional 100 milliseconds for an SNN modeled according to the size of the human brain. However, in this case, the search and match operation needs to be performed again, and not once, but 100 times (applying each of the 100 delay buckets to the pre-synaptic ID array, shifting it, and applying again etc). The scope of the search is limited to only the synaptic connections (e.g., pre-synaptic spike IDs) of the neurons that emitted a spike in a given time step. Assuming there is 1 millisecond, and assuming that the search and match has a budget of 100 microseconds for a human brain-sized SNN per single pass (or 2 microseconds in the HPC version), it is over our budget for human brain (100×100 microseconds=10 ms). For HPC versions, the latency of this operation is better. In addition, the amount of memory access this process requires would result in significant power consumption.

Another way to implement LTP computation after post-synaptic spike is to store a spike history after the search and match operation. The spike history includes data indicating the last time step for each synapse when that synapse received a spike. Assuming that there are 100 time steps with each time step being 1 millisecond, the spike time width can be limited to 7 bits for human brain. Storing and/or updating this spike time can be merged with the search and match operation. Upon detecting a spike ID match for a certain synaptic connection, the time of this connection is updated. Moreover, the time step update can be merged with weight retrieval and immediate write-back when the weight is accessed for synaptic integration (merged with LTD as discussed above) if the weight and its time step are stored in co-allocated manner. Thus, on a write-back of synapse, a new time is recorded, which comes with no latency penalty but potentially with a storage penalty, augmenting 7 bits to each weight (32 b+7 b=39 b for human brain). As a result, the memory capacity required for synapses is 1.6M×39/8=7.8 MB for the human brain.

The value of last pre-synaptic spike time (e.g., 7 bits) may be relative to some global offset of the SIMD processor array. This global offset can be updated every 128 time steps. The update of this global offset triggers update of all time steps for all weights. This operation of updating time steps fits well within LTP computation. Thus, to compute the synaptic spike time (e.g., a 7 bit value), the current global offset is subtracted from current time step. This value of last pre-synaptic spike time (e.g., 7 bits) is then updated for all synapses participating in the synaptic integration in a given time step.

An alternative to the 7 bit time step is an analog voltage level stored in a memory cell capacitor (or in a group of thereof). This voltage level naturally decays over time in exponential manner and may be used in weight update computation. This value could be refreshed upon pre-synaptic spike signifying its time proximity to a potential post-synaptic spike. However, to read this analog voltage value the system would require precision analog to digital converters (ADCs). Also, ability to mask off the cells not needing refresh would be needed.

The LTP computation may proceeds after generating a bitmask of post-synaptic spikes by a SIMD processor array. For all set bits within this bitmask (all others are predicated or masked off) the node 100 needs to access each synaptic connection parameter (e.g., weight) and associated pre-synaptic spike time computed relative to current global offset. The node may compute pre-synaptic spike time relative to current time step by computing distance between current time step and current global offset and subtract from that distance the pre-synaptic spike time. The node may detect if computed pre-synaptic spike time within the time steps of LTP window, compute a new weight using same equation as for LTD but positive part of it, and store back new weight along with original synaptic spike time bit value.

In some cases, where strict or direct causality is enforced, the synaptic spike time bit value may need to be invalidated (e.g. by setting it to all 1s), to prevent a weight update for subsequent post-synaptic spikes so to eliminate indirect causality (e.g., a single pre-synaptic spike causing more than one subsequent post-synaptic spikes in the same neuron).

Since the bitmask may be sparse (e.g., 1% of stored neuron identifiers), the LTP operation could be efficiently computed by accessing weight data in columns, each group of columns (e.g., 10 BLs) is associated with a certain neuron. Column-wise access is possible in symmetric memories such as ReRAM cross-point arrays. In such cases another SIMD processors are interfaced from the WL side to compute LTP. Thus, this computation would scale with the number of spiked neurons, (e.g., 1% of the memory array). For standard volatile memory (e.g. DRAM) this is not possible since WLs are facing access transistor gates, but not the actual media. Thus, the computation scales with data allocated across WLs. Hence, bit-parallel allocation would result in better performance for LTP in volatile arrays.

Other embodiments involve allocating weights associated with each neuron horizontally across bit lines such that each neuron takes several WLs. In this embodiment, the computation is parallel within a neuron, but neurons are processed serially (e.g. weights of each neuron are loaded in SIMD processors and processed). These operations may be independent per weight. However, synaptic integration (which may essentially involve summation) is a parallel reduction operation (log complexity), and thus would incur 'log(pre-synaptic spikes)' penalty and more complex hardware. However, this option should not be de-emphasized, especially considering sparsity of the pre-synaptic spikes. The main difficulty in implementing it is that search-match operation may be more efficient when done for all neurons by delay buckets than one neuron at a time (matching all spike IDs against a single neuron vs for many). However, with neuron-parallel searching, the pipelining of a spike bitmask might not be possible until it goes through all delay buckets.

By merging the LTP computation in the current step with synaptic integration and/or the LTD of the next step, the bit-parallel allocation or horizontal allocation may not play much difference in performance and power (depending on the shunting capabilities of the memory array).

The latency of the LTP operation is similar to search and match operation (same number of WLs to access), however, it is read-modify-write access as opposed to read-write-back access as in search and match operation. Assuming a budget of 10 nanoseconds for the LTP computation resulting in 30 ns for each WL, LTP computation will take 3200 WLs×30 ns=96 us or ~100 us with extra budget for human brain (e.g., for 32 b floats stored in 100 delay buckets 10 weights each). The 30 nanosecond for a single LTP vector operation can be further reduced by pipelining multiple operations. For example, a 10 nanosecond 1st read, a 10 nanosecond 2nd read, a 10 nanosecond computation on the data from 1st read, a 10 nanosecond 1st write, a 10 nanosecond compute on the data from 2nd read, and a 10 nanosecond 2nd write would equate to a total of 40 nanosecond (due to pipelining) instead of 60 nanosecond. This operation would require an additional set of vector registers at the SIMD processor.

The update of the global offset, if it runs out of time step limit, can be integrated with LTP step without latency penalty (in any case data for the entire selection of WLs need to be read and written back due to volatile nature of DRAM). For an HPC version (e.g., where the spike IDs 37-bit word is read at once from 37 arrays for human and in this case, there can be 32 b floats read the same way) the latency of this operation is 100 delay buckets×30 nanosecond, which is 3 microseconds for the human brain. This operation can be further improved (in order to balance compute with memory accesses) by pipelining technique described above.

The LTP weight update for pre-synaptic spikes received in a time step when a neuron makes a post-synaptic spike will be valid. This is because the Vm computation, and consequently post-synaptic spike, depends on charge and/or current integration. The pre-synaptic spikes that arrived in the time step when neuron generates a post-synaptic spike contribute the most to the generated post-synaptic spike.

In another embodiment, the LTP computation can be moved to the next time step and can be merged with synaptic integration and LTD, thus resulting in just a single pass per time step across all synapses (without access them two times: first for synaptic integration/LTD and second for LTP). However, the LTP weight update for each weight may need to be done before synaptic integration so to preserve SNN algorithm dependencies. Thus, for all weights receiving spikes, the rule may be described as follows: LTP (from the last step)=>synaptic integration with LTD=>Vm update.

Because LTP is used to detect current post-synaptic spikes, it may be better to limit LTP to only weights receiving spikes in the current time step, so to compute synaptic integration with LTD and perform a Vm update as soon as possible. This would allow to proceed with detecting post-synaptic spikes and sending them to the SNN network as soon as possible. After this is done, and new spikes are detected and generated, the SNN system would need to proceed with applying LTP to other weights for neurons that generated spikes in the last time step. Thus, the consequences of moving LTP to the next step may require splitting weight scan into two parts (one with synaptic integration/LTD and one without).

Yet, in another alternative version the computation of the next time step can 'step-ahead.' In this embodiment, the operation starts immediately after Vm update and can proceed to the point requiring dependencies (new spikes yet to be received). In this case LTP computation, just like in the version above, can be merged with synaptic integration and LTD of the next step.

In the next time step, the node may 'crank' the delay buckets and start the search operation for the same set of spikes but with a '++1' offset relative to the pre-synaptic IDs in delay buckets. The computation proceeds normally with search in all delay buckets except the one yet to arrive from the network. The spike masks are generated, then LTP (from this step)=>synaptic integration with LTD (for the next step). The LTP is performed for each weight of each spiked neuron. Synaptic integration with LTD are performed as per partial spike mask. After all this is pre-computed the node 100 may stall standing by to receive the most resent set of spikes from the SNN network.

At item 722, the node 100 generates and transmits outbound spike messages 307. The outbound spike message 307 is generated, in response to identifying membrane potential value and if that value has crossed a spike threshold, which may happen or not depending on the evolution of membrane potential. The outbound spike message 307 includes the target neuron 424 as the source neuron. The outbound spike message may also include a time delay 208, time quanta 211, spike strength 214, and potentially other descriptors. The node 100 may transmit the outbound spike message 307 by broadcasting it to other nodes 100 (e.g., via fabric 132) or by routing it back through the input portion of the instant node 100. The outbound spike message 307 is thereafter handled like an inbound spike message 304 (but without needing to be filtered by the input filter) for a subsequent round of processing.

FIG. 7, thus shows an embodiment of pipelining the search and match operation with performing neuromorphic operations. For example, as soon as spike messages start to arrive, the node proceeds processing them. This involves searching in the first delay bucket for matching synaptic connections, generating bitmasks that locate matches, and proceeding with synaptic integration/LTD on that small subset of matches. Upon receiving a barrier message containing the number of spikes to be arrived in this time step, the node 100 may be notified how many spikes it needs expect. When all spike messages arrive, the node 100 proceeds with completing the small fraction of the search and match operations, a fraction of synaptic integration operations, a full Vm update, a generation of new spike messages, and a transmission of the outbound spike messages immediately to the SNN network. This depends on the network performance, because operations proceed on the background of network communication. The memory hardware can be balanced to offset network. Some critical steps become the ones related to a single most recent delay bucket (search and match operation with synaptic integration) and Vm update. Thus, these operations may need to be accelerated by placing related data in the fast cache and pre-loading them, or even pre-computing Vm partly or speculatively. If this is done, then performance of the system like this would be almost fully dependent on the network. All computations and memory accesses may be almost completely hidden by network communication.

In addition, the STDP operations can be further extended with reward modulation by delaying both LTP and LTD until a global reward/punishment signal is received (e.g. by special messages). Instead of computing LTP/LTD triggered by a spike, the node may record the spike time. After that, only if/when a reward message is received, the STDP computation is triggered. The synapse update value may depend on pre- post-synaptic spike timing delta, plus in addition on the time distance between the last post-synaptic spike of a neuron and time when reward is received. With reward modulation feature in place, The SNN may be trained with instrumental or classical conditioning.

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence and pipelining. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor in a computing system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

Figure 8:
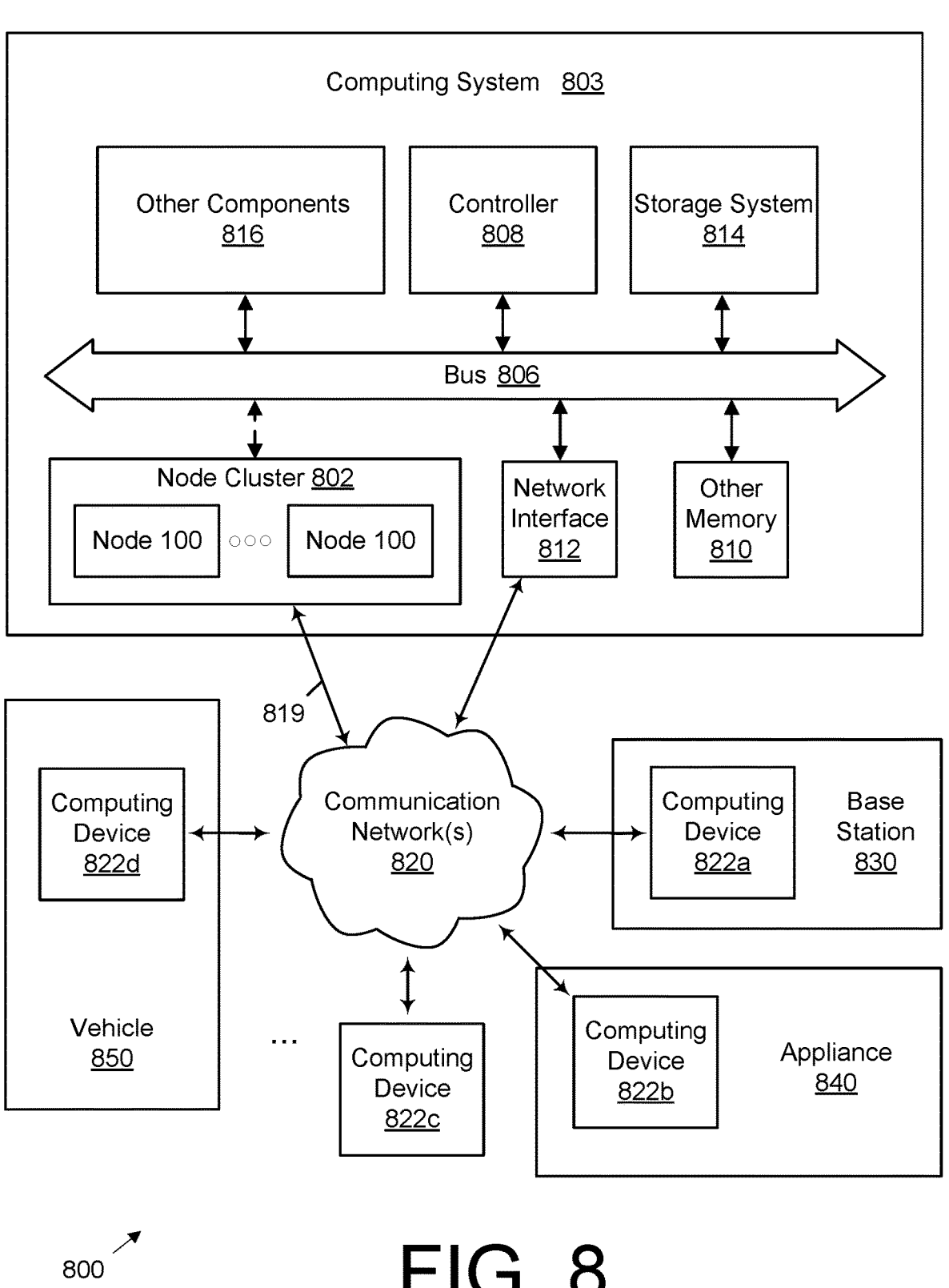
FIG. 8 illustrates an example of a networked system that includes the SNN system as a component according to various embodiments.

FIG. 8 illustrates an example networked system 800 that includes a node cluster 802 made up of a plurality of interconnected nodes 100, in accordance with some embodiments of the present disclosure. A node 100 may include a controller 109 and various memory sections that are integrated together into a single memory device. The single memory device may be fabricated on a single die or may be a multi-die stack. Each node 100 may interface with a plurality of other nodes in the node cluster 802 to implement a spiking neural network (SNN). The SNN is a computer-implemented, memory-based system that is modeled after a BNN to process information.

FIG. 8 illustrates example parts of an example of a computing system 803 which is part of the networked system 800. FIG. 8 shows how a computing system 803 can be integrated into various machines, apparatuses, and systems, such as IoT (Internet of Things) devices, mobile devices, communication network devices and apparatuses (e.g., see base station 830), appliances (e.g., see appliance 840), and vehicles (e.g., see vehicle 850).

The computing system 803 and computing devices of the networked system 800 (e.g., see computing devices 822a, 822b, 822c, and 822d) can be communicatively coupled to one or more communication networks 820. The computing system 803 includes, for example, a bus 806, a controller 808 (e.g., a CPU), other memory 810, a network interface 812, a storage system 814, other components 816 (e.g., any type of components found in mobile or computing devices, GPS components, Input/Output (I/O) components such as various types of user interface components, sensors, a camera, etc.), and the node cluster 802 that implements an SNN. The other components 816 may also include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., Graphics Processing Unit (GPU), Neural Processing Unit (NPU), neuro-processor), or any combination thereof. The bus 806 communicatively couples the controller 808, the other memory 810, the network interface 812, the data storage system 814, and the other components 816, and can couple such components to the node cluster 802 in some embodiments. For example, fabric 132 may couple to the bus 806.

The computing system 803 includes a computer system having a controller 808, other memory 810 (e.g., random access memory (RAM), read-only memory (ROM), flash memory, dynamic random-access memory (DRAM) such as synchronous DRAM (SDRAM) or Rambus DRAM (RDRAM), static random-access memory (SRAM), cross-point or cross-bar memory, crossbar memory, Flash NAND or NOR etc.), the node cluster 802, and data storage system 814, which may communicate with each other via bus 806 (which can include multiple buses).

To put it another way, FIG. 8 includes a block diagram of computing device 822 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 812) to other machines in a Local Area Network (LAN), an intranet, an extranet, and/or the Internet (e.g., see communication network(s) 820). The machine can operate in the capacity of a server or a client machine in client-server network environment, as a peer machine in a peer-to-peer (or distributed) network environment, or as a server or a client machine in a cloud computing infrastructure or environment.

Controller 808 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) micro-processor, single instruction multiple data (SIMD), multiple instructions multiple data (MIMD), or a processor implementing other instruction sets, or processors implementing a combination of instruction sets. Controller 808 can also be one or more special-purpose processing devices such as an ASIC, a programmable logic such as an FPGA, a digital signal processor (DSP), network processor, or the like. Controller 808 is configured to execute instructions for performing the operations and steps discussed herein. Controller 808 can further include a network interface device such as network interface 812 to communicate over one or more communication networks (such as network(s) 820).

The data storage system 814 can include a machine-readable storage medium (also known as a computer-readable medium) on which is stored one or more sets of instructions or software embodying any one or more of the methodologies or functions described herein. The data storage system 814 can have execution capabilities such as it can at least partly execute instructions residing in the data storage system. The instructions can also reside, completely or at least partially, within at least one of the other memory 810 and the node cluster and/or within the controller 808 during execution thereof by the computer system, at least one of the other memory 810 and the node cluster 802 as well as the controller 808 also constituting machine-readable storage media. The other memory 810 can be or include main memory or system memory of the computing device 822.

As mentioned, the networked system 800 includes computing devices, and each of the computing devices can include one or more buses, a controller, a memory, a network interface, a storage system, and other components. Also, each of the computing devices shown in FIG. 8 and described herein can include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to network(s) 820 that includes at least a local to device network such as Bluetooth or the like, a wide area network (WAN), a local area network (LAN), an intranet, a mobile wireless network such as 4G or 5G, an extranet, the Internet, and/or any combination thereof. In some embodiments, as shown with the connection 819, the node cluster 802 can include at least one network interface so that it can communicate separately with other devices via communication network(s) 820. For example, the fabric 132 may couple to the communication network 820. In this respect, a memory module or a memory module system of the node cluster 802 may have its own network interface so that such a component can communicate separately with other devices via communication network(s) 820.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing system 803 shown in FIG. 8, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:

a first memory section configured to store at least one spike message in at least one group, wherein the first memory section is organized by a number of bucket elements which each correspond to a different time step in which spike messages are received;

a second memory section configured to store data indicating a plurality of synaptic connections, each synaptic connection being associated with a source neuron and at least one target neuron, wherein the second memory section is organized by a number of bucket elements associated with each neuron;

a third memory section configured to store a synaptic connection state for each synaptic connection and a neuronal state for each neuron, wherein the third memory section is organized by a number of bucket elements associated with each neuron;

logic configured to search a bucket element associated each neuron of the second memory section in a first clock cycle with respect to a first bucket of the first memory section for a first match between at least a portion of a first spike message and a first synaptic connection, wherein the logic is configured to search for the first match by activating a group of word lines of the second memory section in parallel and activating a group of bit lines of the second memory section in parallel, and wherein the logic is configured to perform the search in response to prioritizing the first spike message according to a delay value of the first spike message;

a sense amplifier array configured to generate a bitmask that indicates the first match, wherein the bitmask signifies a source neuron identifier stored in the group of word lines that matches a first source neuron identifier of the first spike message, and wherein each bit of the bitmask indicates whether there is a match of a bit of the first source neuron identifier against a respective bit retrieved from the stored source neuron identifier; and the logic configured to perform a neuromorphic operation in a second clock cycle with respect to the first match in parallel with searching additional bucket elements of the second memory section for an additional match between at least a portion of the first spike message and an additional synaptic connection, wherein the neuromorphic operation is performed using at least one of the synaptic connection state of the first synaptic connection or the neuronal state of a first neuron stored in a first bucket element of the third memory section;

wherein the search for the first match comprises identification of a bit line that stores at least a portion of a first synaptic connection identifier of the first synaptic connection, and wherein the bit line maps to a corresponding portion of the third memory section that is configured to store the synaptic connection state for the first synaptic connection;

wherein the logic is configured to calculate the neuronal state of the first neuron and synaptic connection state of the first synaptic connection by accessing the third memory section in parallel with searching for the additional match between the first spike message and the additional synaptic connection;

wherein the neuromorphic operation comprises determining a synaptic current associated with the first synaptic connection, determining a change in the first synaptic connection due to Long-Time Depression (LTD), and determining a change for the first synaptic connection due to Long-Time Potentiation (LTP), wherein the synaptic connection state is updated in a single time step and wherein a single time step includes processing all bucket elements by repeating the searching, matching, and neuromorphic operation for each respective bucket element.

2. The system of claim 1, wherein the at least one spike message is assigned to a corresponding spike group according to at least one of a time delay value, a synaptic connection, or a neuron identifier.

3. The system of claim 1, wherein the logic is configured to search for the first match by comparing a bit pattern of the first source neuron identifier of the first spike message to bit patterns of synaptic connection identifiers to identify the first synaptic connection.

4. The system of claim 1, wherein the logic is configured to calculate at least a portion of the neuronal state of the first neuron in response to performing an integration operation across synaptic connections of the first neuron.

5. The system of claim 4, wherein the logic is configured to store the neuronal state of the first neuron in the third memory section.

6. The system of claim 1, wherein the logic, the first memory section, the second memory section, and the third memory section are integrated into a memory device that is configured as a node interfacing with a plurality of other nodes that implement a spiking neural network.

7. A system comprising:

an input filter configured to receive a spike message, the spike message comprising a first source neuron identifier;

a spike cache memory section configured to store at least one spike message in at least one group, wherein the spike cache memory section is organized by a number of bucket elements which each correspond to a different time step in which spike messages are received;

a first memory section configured to store data indicating a plurality of synaptic connections, each synaptic connection referencing at least one of a source neuron identifier of a source neuron or a target neuron identifier of a target neuron, wherein the first memory section is organized by a number of bucket elements associated with each neuron;

a second memory section configured to store a synaptic connection state for each synaptic connection, wherein the second memory section is organized by a number of bucket elements associated with each neuron;

logic configured to search a first bucket element of each neuron of the first memory section in a first clock cycle with respect to a first bucket of the spike cache memory section to identify at least one first match of the first source neuron identifier and a first synaptic connection, wherein the logic is configured to perform the search by activating a group of word lines of the first memory section in parallel and activating a group of bit lines of the first memory section in parallel, wherein the logic is configured to perform the search in response to prioritizing the spike message according to a delay value of the spike message;

the logic being configured to perform a neuromorphic operation in a second clock cycle with respect to the first match using the synaptic connection state of the first synaptic connection stored in a first bucket element of the second memory section in parallel with performing a search in the second clock cycle; and a sense amplifier array configured to generate a bitmask that indicates the first match, wherein the bitmask signifies a source neuron identifier stored in the group of word lines that matches the first source neuron identifier of the spike message, and wherein each bit of the bitmask indicates whether there is a match of a bit of the first source neuron identifier against a respective bit retrieved from the stored source neuron identifier;

wherein the first match is identified by identifying a bit line corresponding to a matching synaptic connection, and wherein the bit line maps to a corresponding portion of the second memory section that is configured to store the synaptic connection state and a neuronal state of a neuron associated with the matching synaptic connection;

wherein the logic is configured to calculate a first neuronal state of a first neuron and synaptic connection state of the first synaptic connection in a second clock cycle with respect to the first match by accessing the second memory section in parallel with searching additional bucket elements of the first memory section for an additional match between a first spike message and an additional synaptic connection;

wherein the neuromorphic operation comprises determining a synaptic current associated with the first synaptic connection, determining a change in the first synaptic connection due to Long-Time Depression (LTD) and determining a change for the first synaptic connection due to Long-Time Potentiation (LTP), wherein the synaptic connection state is updated in a single time step and wherein a single time step includes processing all bucket elements by repeating the searching, matching, and neuromorphic operation for each respective bucket element.

8. The system of claim 7, wherein the logic is configured to search for the first match by contemporaneously comparing the first source neuron identifier to a set of patterns stored in the first memory section.

9. The system of claim 7, wherein the logic is configured to calculate a second neuronal state in response to performing the neuromorphic operation.

10. The system of claim 9, wherein the logic is configured to store the second neuronal state in the second memory section.

11. The system of claim 9, wherein the logic is configured to calculate the second neuronal state by accessing the second memory section in parallel with performing the search for the first match.

12. The system of claim 7, wherein the logic, the input filter, the first memory section, and the second memory section are integrated into a memory device that is configured as a node interfacing with a plurality of other nodes that implement a spiking neural network.

13. A method comprising:

receiving a spike message, the spike message comprising a first source neuron identifier;

storing the spike message in at least one group in a spike cache memory section, wherein the spike cache memory section is organized by a number of buckets which each correspond to a different time step in which spike messages are received;

storing data indicating a plurality of synaptic connections in a first memory section, each synaptic connection referencing at least one of a source neuron identifier of a source neuron or a target neuron identifier of a target neuron, wherein the first memory section is organized by a number of bucket elements associated with each neuron;

storing a synaptic connection state for each synaptic connection in a second memory section, wherein the second memory section is organized by a number of bucket elements associated with each neuron;

searching a first bucket element of the first memory section in a first clock cycle with respect to a first bucket of the spike cache memory section to identify at least one first match of the first source neuron identifier and a first synaptic connection, wherein the first match is identified by identifying a bit line corresponding to a matching synaptic connection, wherein the searching is performed in response to prioritizing the spike message according to a delay value of the spike message, wherein a sense amplifier array generates a bitmask that indicates the first match, wherein the bitmask signifies a source neuron identifier stored in a group of word lines that matches the first source neuron identifier of the spike message, and wherein each bit of the bitmask indicates whether there is a match of a bit of the first source neuron identifier against a respective bit retrieved from the stored source neuron identifier;

performing a neuromorphic operation in a second clock cycle with respect to the first match using the synaptic connection state of the first synaptic connection stored in a first bucket element of the second memory section in parallel with performing a search in the second clock cycle; and searching for an additional match between a first spike message and an additional synaptic connection, wherein the second memory section is configured to store the synaptic connection state for the first synaptic connection, and a neuronal state of a first neuron and synaptic connection state of the first synaptic connection are calculated in a second clock cycle with respect to the first match by accessing the second memory section in parallel with searching additional bucket elements of the first memory section for the additional match;

wherein the identified bit line stores at least a portion of a first synaptic connection identifier of the first synaptic connection, and wherein the bit line maps to a corresponding portion of the memory section;

wherein the neuromorphic operation comprises determining a synaptic current associated with the first synaptic connection, determining a change in the first synaptic connection due to Long-Time Depression (LTD), and determining a change for the first synaptic connection due to Long-Time Potentiation (LTP), wherein the synaptic connection state is updated in a single time step and wherein a single time step includes processing all bucket elements by repeating the searching, matching, and neuromorphic operation for each respective bucket element.

14. The method of claim 13, wherein the search for the first match is performed by contemporaneously comparing the first source neuron identifier to a set of stored patterns.

* * * * *